United States Patent
Choi

(10) Patent No.: US 12,470,786 B2
(45) Date of Patent: Nov. 11, 2025

(54) IMAGE ACQUISITION APPARATUS AND ELECTRONIC APPARATUS INCLUDING SAME, AND METHOD OF CONTROLLING IMAGE ACQUISITION APPARATUS

(71) Applicant: SAMSUNG ELECTRONICS CO., LTD., Suwon-si (KR)

(72) Inventor: Heejin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 183 days.

(21) Appl. No.: 18/218,361

(22) Filed: Jul. 5, 2023

(65) Prior Publication Data

US 2024/0107134 A1  Mar. 28, 2024

(30) Foreign Application Priority Data

Sep. 23, 2022 (KR) .......................... 10-2022-0121116

(51) Int. Cl.
    *H04N 23/11*  (2023.01)
    *G01J 3/28*  (2006.01)
    *H04N 23/73*  (2023.01)
    *H04N 23/741*  (2023.01)
    *H04N 25/13*  (2023.01)

(52) U.S. Cl.
    CPC ............ *H04N 23/11* (2023.01); *G01J 3/2823* (2013.01); *H04N 23/73* (2023.01); *G01J 2003/2826* (2013.01)

(58) Field of Classification Search
    CPC ........ H04N 23/11; H04N 23/73; H04N 23/70; H04N 23/741; H04N 25/58; H04N 23/45; H04N 25/135; G01J 3/2823; G01J 2003/2826
    See application file for complete search history.

(56) References Cited

U.S. PATENT DOCUMENTS 8,059,174 B2 *  11/2011  Mann ................... H04N 23/741
                                                        348/222.1
8,547,451 B2  10/2013  Cho et al.
(Continued)

FOREIGN PATENT DOCUMENTS

JP       2018-125848 A    8/2018
KR   10-2011-0082421 A    7/2011
(Continued)

OTHER PUBLICATIONS

Pierre-Jean Lapray et al., "High Dynamic Range Spectral Imaging Pipeline for Multispectral Filter Array Cameras", Sensors, vol. 17, No. 6, Article No. 1281, Jun. 3, 2017, 25 pages, DOI: 10.3390/s17061281.

(Continued)

*Primary Examiner* — Ahmed A Berhan
(74) *Attorney, Agent, or Firm* — Sughrue Mion, PLLC

(57) ABSTRACT

An image acquisition apparatus includes a multispectral imaging sensor for acquiring images of at least four channels based on a wavelength band of about 10 nm to about 1000 nm and a processor for setting an exposure time for each of the four channels based on transmission efficiency and quantum efficiency for each wavelength of each of the four channels and generating an HDR image using image signals corresponding to the four channels and obtained according to the set exposure time.

20 Claims, 35 Drawing Sheets

(56) References Cited

U.S. PATENT DOCUMENTS

| | | |
|---|---|---|
| 8,810,678 B2 | 8/2014 | Kawamura et al. |
| 2007/0285526 A1 | 12/2007 | Mann et al. |
| 2018/0027191 A2* | 1/2018 | Grauer ................ H10F 39/8053 |
| | | 348/164 |
| 2019/0204577 A1* | 7/2019 | Faris .................. G02B 21/0088 |
| 2020/0259991 A1 | 8/2020 | Rivard et al. |
| 2021/0195122 A1 | 6/2021 | Machida et al. |
| 2023/0349758 A1 | 11/2023 | Kim et al. |

FOREIGN PATENT DOCUMENTS

| | | |
|---|---|---|
| KR | 10-2023-0153907 A | 11/2023 |
| WO | 2011/132617 A1 | 10/2011 |

OTHER PUBLICATIONS

Johannes Brauers et al., "Multispectral High Dynamic Range Imaging", IS&T/SPIE Electronic Imaging, Jan. 2008, pp. 680704-1-680704-12.

OpenCV (Open Source Computer Vision), "High Dynamic Range (HDR)", 3.4.20-dev, generated on 2024, 4 pages, url: https://docs.opencv.org/3.4/d2/df0/tutorial_py_hdr.html.

Communication issued Jul. 2, 2024 by the Korean Intellectual Property Office in Korean Patent Application No. 10-2022-0121116.

\* cited by examiner

| C | M | C | M | C | M | C | M | C | M | C | M | C | M | C | M |
|---|---|---|---|---|---|---|---|---|---|---|---|---|---|---|---|
| Y | G | Y | G | Y | G | Y | G | Y | G | Y | G | Y | G | Y | G |
| C | M | C | M | C | M | C | M | C | M | C | M | C | M | C | M |
| Y | G | Y | G | Y | G | Y | G | Y | G | Y | G | Y | G | Y | G |
| C | M | C | M | C | M | C | M | C | M | C | M | C | M | C | M |
| Y | G | Y | G | Y | G | Y | G | Y | G | Y | G | Y | G | Y | G |
| C | M | C | M | C | M | C | M | C | M | C | M | C | M | C | M |
| Y | G | Y | G | Y | G | Y | G | Y | G | Y | G | Y | G | Y | G |
| C | M | C | M | C | M | C | M | C | M | C | M | C | M | C | M |
| Y | G | Y | G | Y | G | Y | G | Y | G | Y | G | Y | G | Y | G |
| C | M | C | M | C | M | C | M | C | M | C | M | C | M | C | M |
| Y | G | Y | G | Y | G | Y | G | Y | G | Y | G | Y | G | Y | G |
| C | M | C | M | C | M | C | M | C | M | C | M | C | M | C | M |
| Y | G | Y | G | Y | G | Y | G | Y | G | Y | G | Y | G | Y | G |
| C | M | C | M | C | M | C | M | C | M | C | M | C | M | C | M |
| Y | G | Y | G | Y | G | Y | G | Y | G | Y | G | Y | G | Y | G |

| 1  | 2  | 5  | 6  |
|----|----|----|----|
| 3  | 4  | 7  | 8  |
| 9  | 10 | 13 | 14 |
| 11 | 12 | 15 | 16 |

FIG. 16A

IMAGE ACQUISITION APPARATUS AND ELECTRONIC APPARATUS INCLUDING SAME, AND METHOD OF CONTROLLING IMAGE ACQUISITION APPARATUS

CROSS-REFERENCE TO RELAT APPLICATION

This application is based on and claims priority under 35 U.S.C. § 119 to Korean Patent Application No. 10-2022-0121116, filed on Sep. 23, 2022, in the Korean Intellectual Property Office, the disclosure of which is incorporated by reference herein in its entirety.

BACKGROUND

1. Field

The disclosure relates to an image acquisition apparatus and an electronic apparatus including the same, and a method of controlling the image acquisition apparatus.

2. Description of the Related Art

An imaging sensor is an apparatus that receives light incident from an object and photoelectrically converts the received light to generate electrical signals. For color expression, the imaging sensor usually uses a color filter composed of an array of filter elements that selectively transmits red light, green light, and blue light, and after sensing the amount of light transmitted through each filter element, a color image of the object is formed through image processing.

A spectral filter including an multispectral imaging (MSI) sensor has a Fabry-Perot cavity structure that uses resonance caused by a specific wavelength of light between two reflectors to generate an image composed of only a specific wavelength band. These spectral channels may be configured in, for example, a 4×4 array. Such a unit filter structure represents one piece of spatial information, and there are, for example, 640×480 such unit filters, thereby enabling multispectral imaging of 640×480 pixels composed of 16 channels of different wavelength bands.

In general, resonance efficiency of a reflector of the Fabry-Perot cavity for each wavelength varies due to the difference in reflectivity according to wavelengths, which affects transmission efficiency (hereinafter referred to as TE). In addition, with respect to a CMOS sensor, quantum efficiency (hereinafter referred to as QE) for each wavelength is not constant and decreases toward a longer wavelength. The QE×TE values considering both of these effects vary greatly for each spectral channel, and a channel of a specific wavelength is saturated more easily than a channel of another wavelength when imaging with MIS.

In addition, due to the dynamic range of the scene itself, a specific object in the scene may be too dark or saturated with one exposure time. In this case, there is a high dynamic range (hereinafter referred to as HDR) imaging method capable of obtaining images from multiple images having different exposure times without saturation of all objects. However, it is difficult to apply this technique to a dynamic object because several images must be obtained sequentially.

SUMMARY

Provided are an image acquisition apparatus and an electronic apparatus including the same, and a method of controlling the image acquisition apparatus.

Additional aspects will be set forth in part in the description which follows and, in part, will be apparent from the description, or may be learned by practice of the presented embodiments of the disclosure.

According to an aspect of the disclosure, there is provided an image acquisition apparatus including: a multispectral imaging sensor configured to acquire a plurality of image signals corresponding to at least four channels based on a wavelength band of about 10 nm to about 1000 nm; and a processor configured to: set an exposure time for each of the at least four channels based on transmission efficiency for each of a plurality of wavelengths of each of the at least four channels and quantum efficiency for each of the plurality of wavelengths of each of the at least four channels, and generate a high dynamic range (HDR) image based on the plurality of image signals corresponding to the at least four channels, the plurality of image signals being obtained based on the set exposure time.

The processor may be further configured to set a different exposure time for each of the at least four channels based on a value obtained by multiplying the transmission efficiency for each of the plurality of wavelengths and the quantum efficiency for each of the plurality of wavelengths.

Each of the at least four channels ma include N×N pixels, wherein the processor may be further configured to set a different exposure time for each of the N×N pixels, and wherein N is a natural number greater than or equal to 2.

The processor may be further configured to extract a first image signal, among the plurality of image signals, from a first pixel for which a shortest exposure time is set among the N×N pixels when a brightness of an object is greater than or equal to a first threshold value.

The processor may be further configured to extract a second image signal, among the plurality of image signals, from a second pixel for which a longest exposure time is set among the N×N pixels when a brightness of an object is less than a first threshold value.

A maximum value of the exposure time may be set based on a value obtained by multiplying the transmission efficiency for each of the plurality of wavelengths and the quantum efficiency for each of the plurality of wavelengths.

A value obtained by multiplying the transmission efficiency for each of the plurality of wavelengths and the quantum efficiency for each of the plurality of wavelengths may be a magnitude of a signal of the MSI sensor, the signal being output per unit time.

Te processor may be further configured to: set a first exposure time for a first channel in which the value obtained by multiplying the transmission efficiency for each of the plurality of wavelengths and the quantum efficiency for each of the plurality of wavelengths of the first channel is equal to or greater than a first threshold value, and set a second exposure time for a second channel, in which the value obtained by multiplying the transmission efficiency for each of the plurality of wavelengths and the quantum efficiency for each of the plurality of wavelengths of the second channel is less than the first threshold value, the second exposure time being longer than the first exposure time.

The processor may be further configured to: group channels having same wavelength bands among the at least four channels, and set a different exposure time for each of the grouped channels.

The respective areas of the at least four channels of the MSI sensor may be different from each other.

The processor may be further configured to set a different analog gain value for each of the at least four channels.

According to another example embodiment, an electronic apparatus includes the image acquisition apparatus.

According to another aspect of the disclosure, there is provided a method of controlling an image acquisition apparatus a multispectral imaging sensor configured to acquire a plurality of image signals corresponding to at least four channels based on a wavelength band of about 10 nm to about 1000 nm, the method including: setting an exposure time for each of the at least four channels based on transmission efficiency for each of a plurality of wavelengths of each of the at least four channels and quantum efficiency for each of the plurality of wavelengths of each of the at least four channels; and generating a high dynamic range (HDR) image based on the plurality of image signals corresponding to the at least four channels the plurality of image signals being obtained based on the set exposure time.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 7 to 9 are diagrams illustrating exemplary pixel arrangements of an imaging sensor;

FIGS. 15A, 15B, 16A, 16B, 17A, 17B, 18A and 18B are exemplary diagrams for explaining control of an exposure time for each channel according to various embodiments;

DETAIL DESCRIPTION

Figure 1:
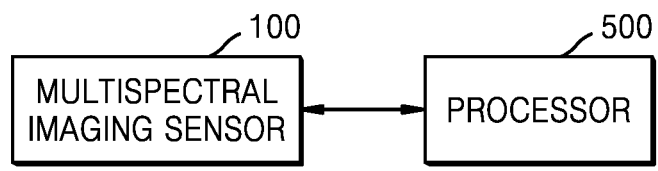
FIG. 1 is a block diagram showing a schematic structure of an image acquisition apparatus according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. The described embodiments are merely illustrative, and various modifications are possible from these embodiments. In the following drawings, the same reference numbers refer to the same components, and the size of each component in the drawings may be exaggerated for clarity and convenience of description.

Hereinafter, the terms such as "above" and "on" may include any of physically in contact and without contact at a higher level.

The terms such as "first", "second" etc. may be used to describe various components, but are used only for the purpose of distinguishing one component from another. These terms are not intended to limit the difference in material or structure of components.

Singular expressions include plural expressions unless the context clearly dictates otherwise. In addition, when a part "includes" a certain component, it means that it may further include other components, not excluding other components unless otherwise stated.

In addition, terms such as "unit", "module" etc. described in the description may include a unit that processes at least one function or operation, which may be implemented as hardware or software or a combination thereof.

Use of the term "the" and similar denoting terms may correspond to both singular and plural.

Operations of a method may be performed in any suitable order, unless explicitly stated that they must be performed in the order described. In addition, the use of all exemplary terms (for example, etc.) is simply for explaining technical ideas in detail, and the scope of rights is not limited due to these terms unless limited by claims.

In an example embodiment, HDR or High Dynamic Range Imaging (HDRI) is a technique used in imaging and photography to reproduce a greater dynamic range of light intensity than is possible with standard digital imaging or photography techniques. Human eyes can adapt to a wide range of lighting conditions, but most imaging apparatuses are limited to 256 levels since they use 8 bits per channel. When taking a photo of a real scene, a single exposure may not capture all the detail as bright areas can be overexposed while dark areas can be underexposed. HDR imaging works with images that use more than 8 bits per channel (usually 32-bit floating point values), allowing for a much wider dynamic range.

There are many ways to get HDR images, but the most common way is to use photos of a scene taken with different exposure values. In order to combine these exposures, it is useful to know camera response functions and various algorithms are available to estimate them. After the HDR images are merged, they must be converted back to 8-bit to be viewed on a typical display, a process called tone mapping.

In an example embodiment, multispectral imaging (MSI) may use a spectral filter having a Fabry-Perot structure. A Fabry-Perot structure is generally constructed by inserting a cavity or resonant layer between two mirrors having high reflectivity. The basic principle of filters is that when various wavelengths such as λ1, λ2, λ3, λ4, λ5, etc. transmitted through an optical fiber are incident on a filter, multiple interference occurs in the cavity to transmit only a specific wavelength and reflect other wavelengths. By doing so, only data or information of interest may be selected. In an example embodiment, MSI uses a spectral filter having a Fabry-Perot structure, but is not limited thereto. As such, according to another example embodiment, multispectral imaging may be performed using a different structure.

FIG. 1 is a block diagram showing a schematic structure of an image acquisition apparatus according to an example embodiment.

Referring to FIG. 1, an image acquisition apparatus includes a multispectral imaging (MSI) sensor 100 and a processor 500.

The multispectral imaging sensor 100 acquires images of a plurality of channels. According to an example embodiment, the MSI sensor 100 may acquire at least 4 channels based on a wavelength band of about 10 nm to about 1000 nm. In addition, the MSI sensor 100 may generate images of 16 channels within a wavelength range of about 10 nm to about 1000 nm, or may generate images of 31 channels by interpolating images of 16 channels. The number of channels that may be acquired or generated by the MSI sensor 100 is not limited to 4, 16, or 31.

According to an example embodiment, the processor 500 sets an exposure time for each of the four channels based on transmission efficiency and quantum efficiency for each wavelength of each of the four channels from the MSI sensor 100. The processor 500 acquires image signals by controlling the exposure time of four channels of the MSI sensor 100 according to the set exposure time, and generates an HDR image using the obtained image signals corresponding to the four channels.

Figure 14A:
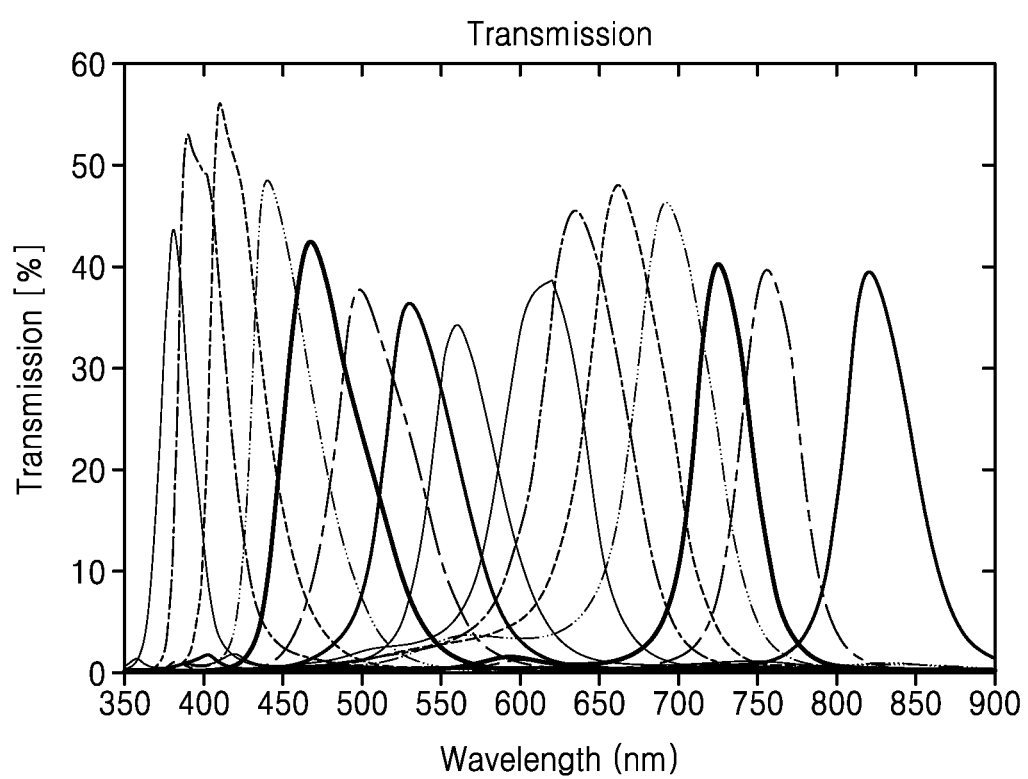
FIGS. 14A to 14D are exemplary diagrams for explaining transmission efficiency and quantum efficiency for each wavelength in a multispectral imaging sensor.

For reference, the transmission efficiency for each wavelength means a transmission ratio for each wavelength of the spectral filter. In general, a reflector of the spectral filter of the Fabry-Perot cavity has different resonance efficiency for each wavelength due to the difference in reflectivity according to wavelengths, which affects transmission efficiency. Referring to FIG. 14A, transmission efficiency (TE) of a spectral filter for each channel of the MSI sensor 100 according to an exemplary embodiment is illustrated.

Figure 14B:
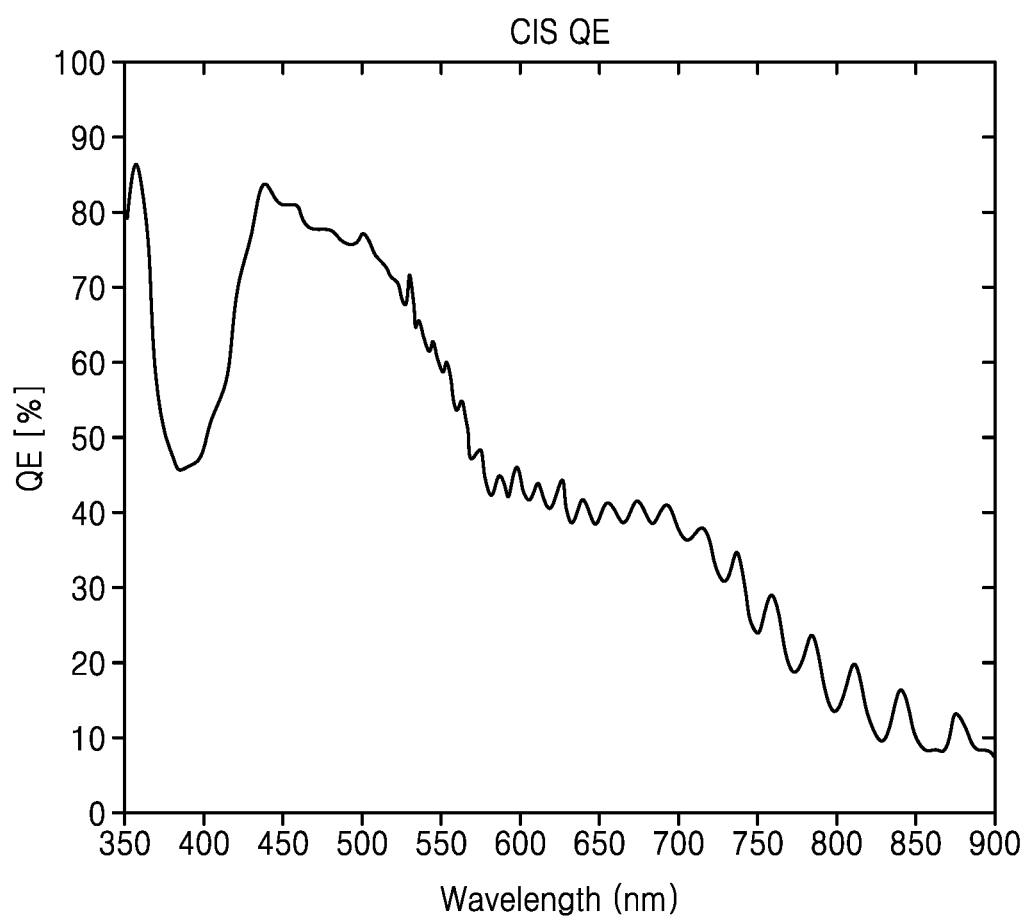

In addition, the quantum efficiency (QE) for each wavelength is a conversion ratio to indicate the efficiency of each pixel of the sensor in converting photons into electrons at a specific wavelength (nm). A higher ratio of QE indicates higher sensitivity for detecting light. In addition, with respect a CMOS sensor, quantum efficiency is not constant for each wavelength and tends to decrease toward a longer wavelength. Referring to FIG. 14B, quantum efficiency (QE) for each wavelength of a MSI sensor 100 according to an example embodiment is illustrated.

Figure 14C:
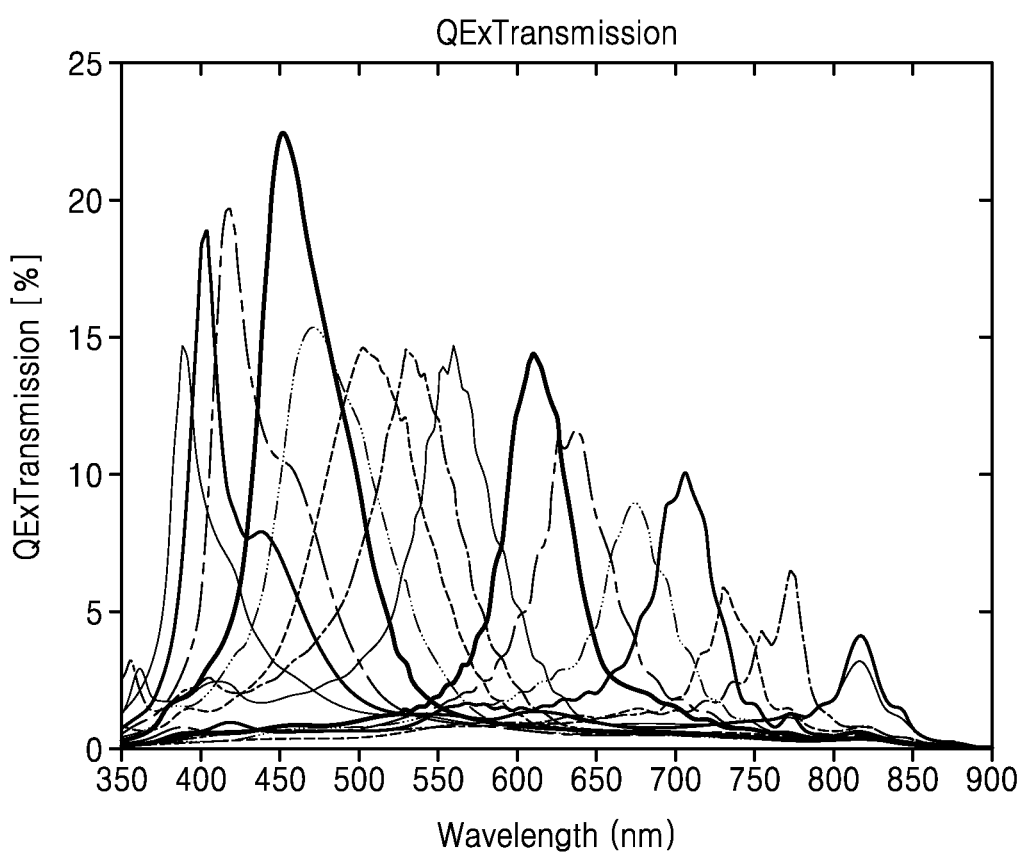

The QE×TE values, which consider both of the QE and TE effects vary greatly for each spectral channel, and a channel of a specific wavelength is saturated more easily than a channel of another wavelength when imaging with the MSI sensor 100. Referring to FIG. 14C, a graph obtained by multiplying transmission efficiency and quantum efficiency for each wavelength or each channel is shown. For reference, the QE×TE value may represent the magnitude of an imaging sensor signal per unit time. In addition, a signal finally output from the imaging sensor is determined according to the relationship between the QE×TE value and the exposure time.

Figure 14D:
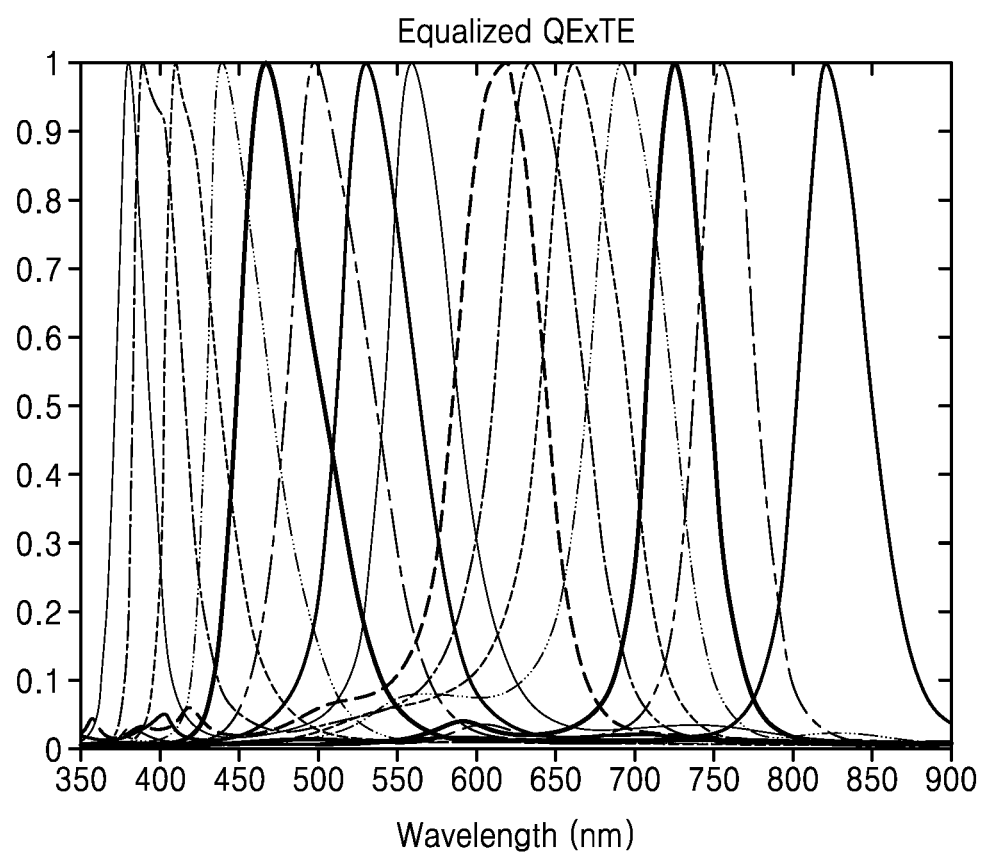

In an example embodiment, by applying a different exposure time for each spectral channel, QE×TE values which differ greatly from channel to channel as illustrated in FIG. 14C may be made similar for all wavelengths or channels as illustrated in FIG. 14D. For example, by applying a short exposure time to a channel with a large QE×TE value and a long exposure time to a channel with a small QE×TE value, the QE×TE values for all channels may be equalized. In an example embodiment, controlling the exposure time will be described later with reference to FIG. 3 and the like.

According to an example embodiment, the processor 500 may set the exposure time differently for each channel of the MSI sensor 100. The processor 500 acquires image signals for each channel according to different exposure times, and generates an HDR image using the obtained image signals. For reference, various algorithms may be used to generate an HDR image using image signals for each channel. For example, a Debevec algorithm, a Robertson algorithm, or a Mertens algorithm may be used. However, in an example embodiment, a method of generating an HDR image using image signals for each channel is not limited thereto.

Figure 2:
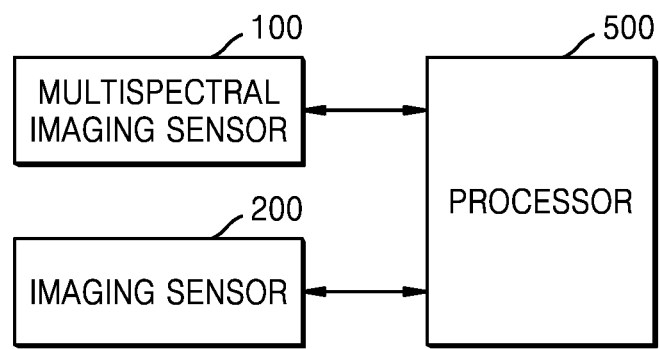
FIG. 2 is a block diagram showing a schematic structure of an image acquisition apparatus according to another example embodiment.

FIG. 2 is a block diagram showing a schematic structure of an image acquisition apparatus according to another example embodiment.

Referring to FIG. 2, an image acquisition apparatus includes a multispectral imaging (MSI) sensor 100, an imaging sensor 200 and a processor 500. An image acquisition apparatus according to another example embodiment may perform HDR on an image captured using a plurality of imaging sensors. The imaging sensor 200 acquires a first image of a first wavelength band and the MSI sensor 100 acquires a second image of the second wavelength band. The second wavelength band may include and be wider than the first wavelength band. For reference, the imaging sensor 200 may be an RGB imaging sensor. The RGB imaging sensor has an R channel, a G channel and a B channel. An MSI sensor has a larger number of channels than the RGB sensor, so it senses light in more wavelength bands. In an example embodiment, the MSI sensor 100 acquires images of a plurality of channels. According to an example embodiment, the MSI sensor acquires images of at least four channels based on a wavelength band of about 10 nm to about 1000 nm. In addition, the MSI sensor 100 may generate images of 16 channels within a wavelength range of about 10 nm to about 1000 nm, or may generate images of 31 channels by interpolating images of 16 channels.

The imaging sensor 200 which is a sensor employed in a general RGB camera may be a CMOS imaging sensor using a Bayer color filter array. A first image IM1 acquired by the imaging sensor 200 may be an RGB image based on red, green, and blue.

The MSI sensor 100 is a sensor that senses light of more types of wavelengths than the imaging sensor 200. The MSI sensor 100 may use, for example, 16 channels, or may use 31 channels, or any other number of channels. The bandwidth of each channel is set to be narrower than R, G, and B bands, and the total bandwidth which is the sum of the bandwidths of all channels includes and may be wider than an RGB bandwidth, that is, the visible light bandwidth. For example, the total bandwidth may be of about 10 nm to about 1000 nm. A second image IM2 obtained by the MSI sensor 100 may be a multispectral or hyperspectral image, may include a wavelength band wider than the RGB wavelength band, for example, the visible light band, and may be an image based on a wavelength where an ultraviolet to infrared wavelength band which is wider than the RGB wavelength band is divided into 16 or more channels. The second image IM2 may be an image obtained by utilizing all available channels of the MSI sensor 100 or may be an image obtained by selecting a specific channel. The spatial resolution of the second image IM2 may be lower than that of the first image IM1, but is not limited thereto.

In an example embodiment, the imaging sensor 200 may be an RGB sensor. According to an example embodiment, the RGB sensor may be a CMOS imaging sensor. The RGB sensor may generate images of three channels by sensing spectrums representing R, G, and B using a Bayer color filter array. However, the disclosure is not limited thereto, and as such, according to other example embodiments, other types of color filter arrays may also be used. The MSI sensor senses and displays light of a different wavelength than the RGB sensor. The MSI sensor is configured to sense light of more types of wavelengths by having a larger number of channels. According to an example embodiment, the MSI sensor may have 16 channels. In another example embodiment, the MSI sensor may have 31 channels. Each channel may adjust a band through which light passes, a transmission amount, and a bandwidth so as to sense light of a desired band. The total bandwidth which is the sum of bandwidths of all channels includes and may be wider than a bandwidth of a conventional RGB sensor. Sensing spectrums or wavelength bands of the RGB sensor and the MSI sensor will be described later with reference to FIGS. 6 and 10.

Figure 3:
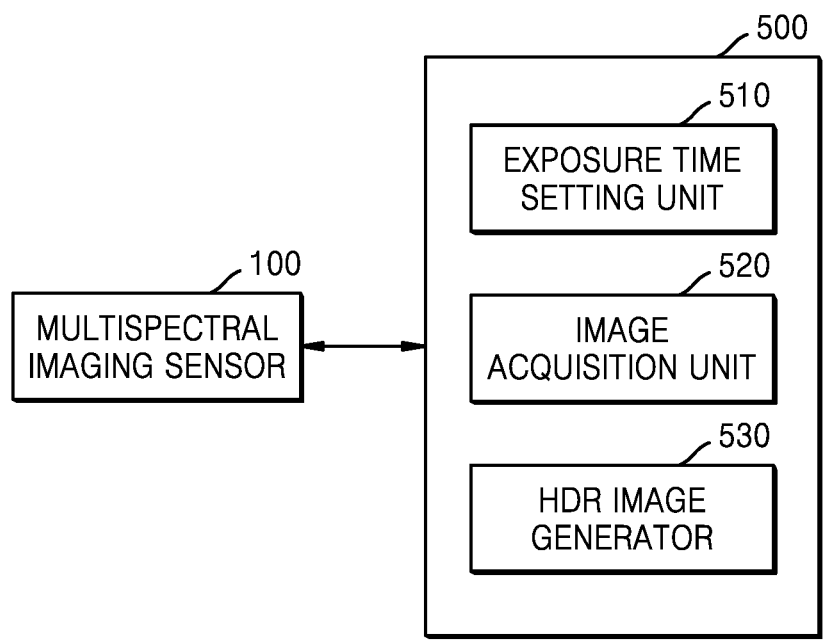
FIG. 3 is a detailed block diagram of a processor shown in FIG. 1.

FIG. 3 is a detailed block diagram of the processor 500 shown in FIG. 1.

Referring to FIG. 3, the processor 500 includes an exposure time setting unit 510, an image acquisition controller 520 and an HDR image generator 530. In an example embodiment, the processor 500 may apply a different exposure time for each channel in consideration of different QE×TE values for each channel of the MSI sensor 100 so that the magnitudes of finally generated signals are similar. In another example embodiment, the processor 500 may vary the area of the channel while maintaining the same exposure time for each channel. In another example embodiment, the processor 500 may apply different analog gains while maintaining the same area of the channel and the same exposure time for each channel to obtain the same or similar signal values after analog to digital conversion (ADC). In some embodiments, the processor 500 may be an image signal processor (hereinafter referred to as an ISP) included in a sensor chip including the MSI sensor 100. According to an example embodiment, " . . . unit", "module", or other components of the processor provided herein may be realized by hardware, software, or a combination of hardware and software.

Referring to FIG. 3, the MSI sensor 100 acquires images of multiple channels based on a wavelength band of about 10 nm to about 1000 nm. The multiple channels may be four channels, but are not limited thereto. That is, according to other example embodiments, the MSI sensor 100 may acquire images of more than four multiple channels.

The exposure time setting unit 510 sets the exposure time for each channel based on transmission efficiency (TE) and quantum efficiency (QE) for each wavelength of each channel.

The image acquisition controller 520 controls to acquire image signals for a plurality of channels according to the exposure time for each channel set by the exposure time setting unit 510.

Figure 15A:
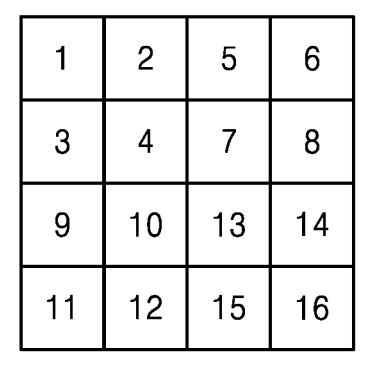

Referring to FIG. 15A, the MSI sensor 100 is composed of 16 channels including channels 1 to 16. Exposure times of channels 1 to 16 are set based on transmission efficiency and quantum efficiency for each wavelength of each channel. The exposure time for each channel may be set differently.

Figure 15B:
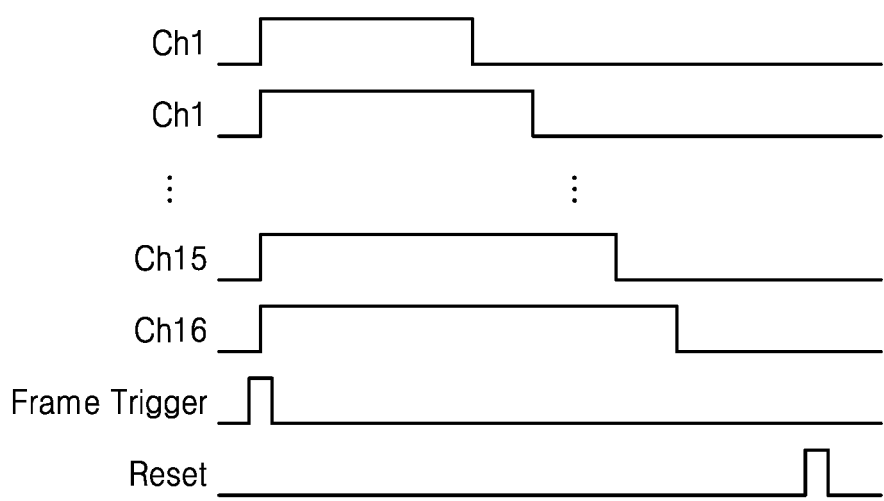

Referring to FIG. 15B, a timing diagram for recording an exposure time of each channel, an activation state of a pixel of each channel, and a sensing signal is shown.

As shown in FIG. 15B, exposure times of channel 1 Ch1 to channel 16 Ch16, lengths of high state, are different from each other, wherein pixels of each channel become active in the high state.

According to an example embodiment, exposure of all channels may start at a rising edge of a frame trigger, but the exposure time of each channel is different. That is, the duration of the exposure of each of the channels may be different. For example, as shown in FIG. 15B, channel 1 has the shortest exposure time and channel 16 has the longest exposure time. At the rising edge of the reset signal, signals generated in each channel are written to the memory. Moreover, a reset signal may be provided after the duration of the exposure times of the channels.

Figure 16A:
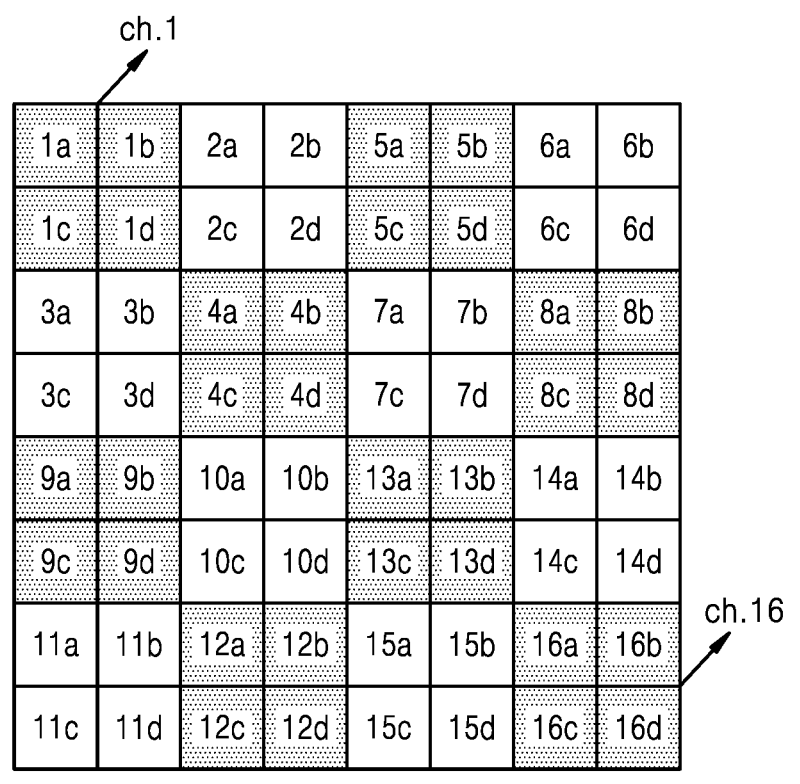

Referring to FIG. 16A, the MSI sensor 100 may include 16 channels, for example, channels 1 to 16. According to an example embodiment, each of the channels may be made of four pixels (a to d). For example, channel 1 is composed of four pixels (1a to 1d), channel 2 is composed of four pixels (2a to 2d), . . . , and channel 16 is composed of four pixels (16a to 16d). Although, FIG. 16A illustrates that each channel is composed of four pixels, that is, 2×2 pixels, the disclosure is not limited thereto, and as such, according to other example embodiments, each channel may be composed of N×N pixels, where N may be a natural number greater than or equal to 2.

Figure 16B:
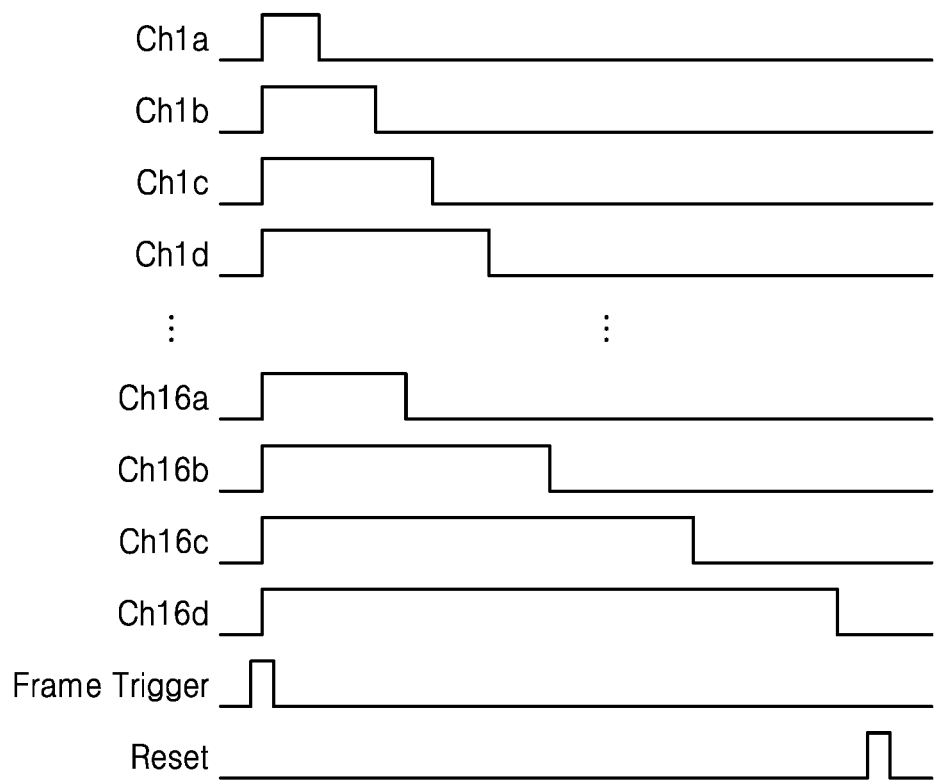

Referring to FIG. 16B, different exposure times are set for pixels of each channel. For example, as shown in FIG. 16B, the length of the exposure time for each of pixels (1a to 1d) of channel 1 Ch1 is set differently. Similarly, the length of the exposure time for each of pixels of channel 2 Ch2 is set differently. At the rising edge of the reset signal, signals generated in pixels of each channel may be recorded in the memory.

In an example embodiment, only a signal of a specific pixel may be extracted from each channel according to the brightness of an object. For example, a bright object may be recorded by extracting a signal of a pixel to which the shortest exposure time is applied from each channel, and a dark object may be recorded by extracting a signal of a pixel to which a long exposure time is applied from each channel. Referring to FIG. 16B, for a bright object, a signal of pixel 1 (Ch1a, Ch2a, Ch16a) may be extracted from each channel and recorded in the memory. For a dark object, a signal of pixel 4 (Ch1d, Ch2d . . . Ch16d) may be extracted from each channel and recorded in the memory.

In an example embodiment, the maximum exposure time of a pixel of each channel may be set based on a value obtained by multiplying transmission efficiency (TE) and quantum efficiency (QE) for each wavelength of each channel. For example, the maximum exposure time may be set based on the minimum TE×QE value for each channel. For reference, an average value for each channel or another reference value may be used as the TE×QE value.

Figure 17A:
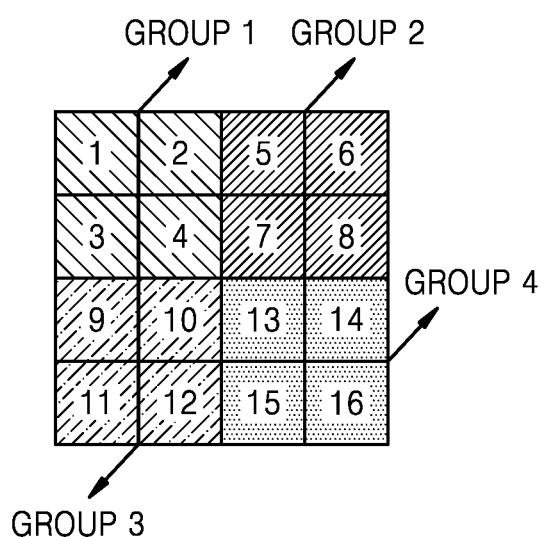

Referring to FIG. 17A, the MSI sensor 100 may include 16 channels, for example, channels 1 to 16, which may be grouped into 4 groups (groups 1 to 4). A criterion for grouping includes grouping spectral channels having similar transmission bands or wavelength bands into one group. For example, channels 1 to 4, channels 5 to 8, and channels 9 to 12 may be grouped into an ultraviolet wavelength band, a visible light wavelength band, an a near-infrared wavelength band, respectively. For reference, the criterion for grouping each channel may vary according to the number of spectral channels of the MSI sensor 100 and applications thereof. In addition, grouping into four groups based on similar transmission bands is illustrated here but is not limited thereto.

Figure 17B:
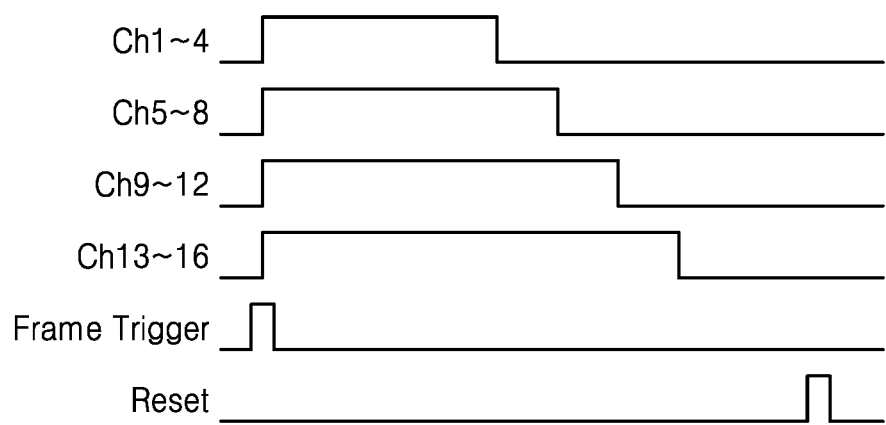

In an example embodiment, a different exposure time is set for each of the four groups. As shown in FIG. 17B, the shortest exposure time may be set for group 1 (channels 1 to 4) and the longest exposure time may be set for group 4 (channels 13 to 16).

Figure 18A:
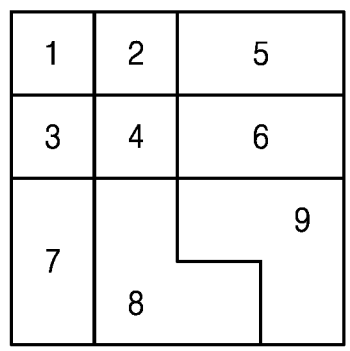

Referring to FIG. 18A, the size or area of each channel of the MSI sensor 100 may be configured differently. As shown in FIG. 18A, the areas of channels 1 to 4, the areas of channels 5 to 7, and the areas of channels 8 to 9 are set to be different from each other.

Figure 18B:
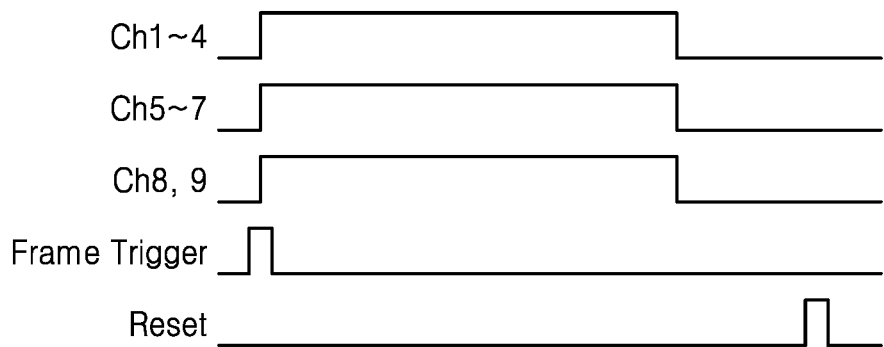

Referring to FIG. 18B, exposure times for channels 1 to 4, channels 5 to 7, and channels 8 to 9 are set to be the same.

The HDR image generator 530 generates an HDR image using image signals for each channel obtained under the control of the image acquisition controller 520. For generating an HDR image, a Debevec algorithm, a Robertson algorithm, or a Mertens algorithm may be used. However, in an example embodiment, a method of generating an HDR image using image signals for each channel is not limited thereto.

Figure 4:
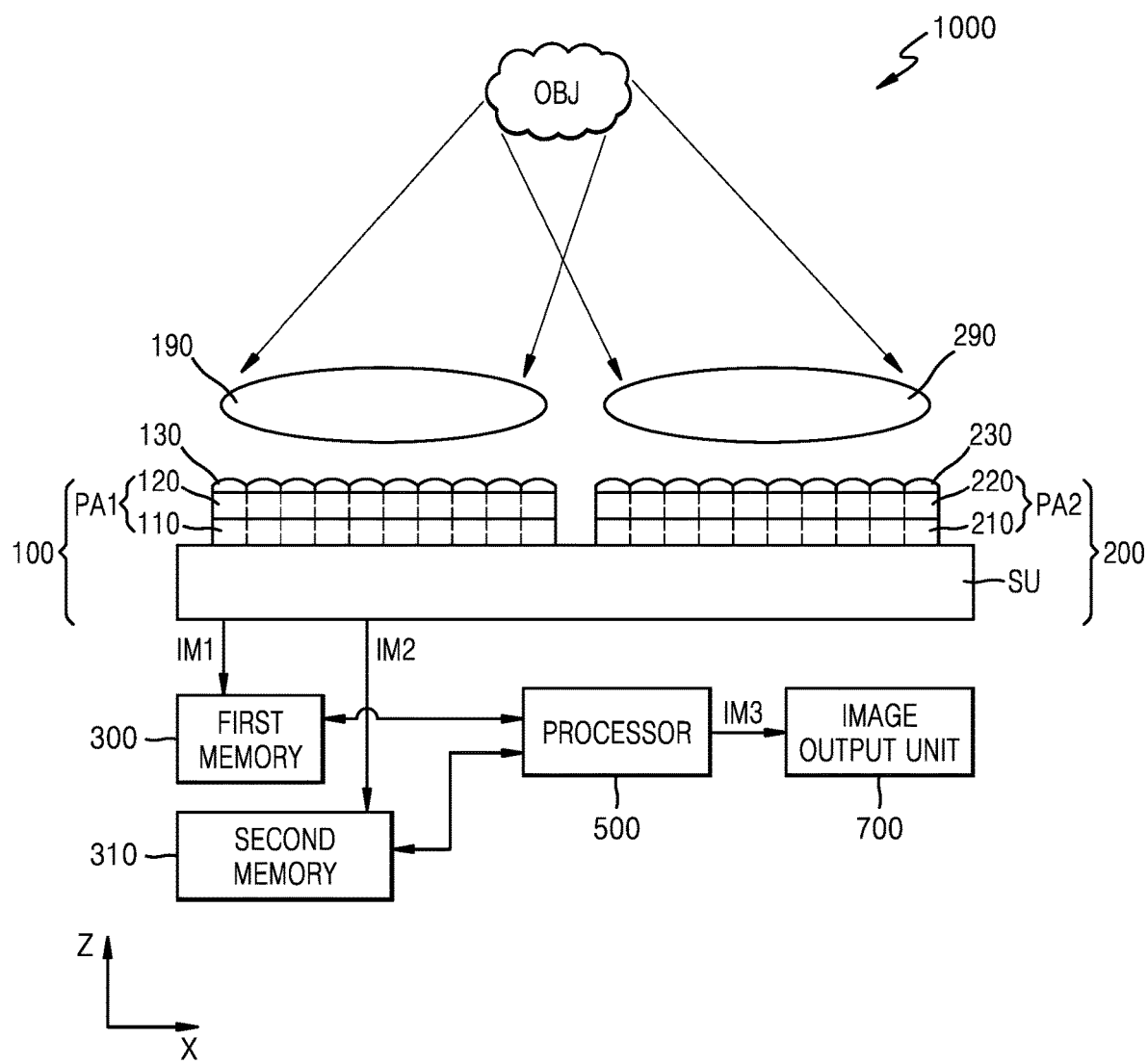
FIG. 4 is a conceptual diagram showing a schematic structure of the image acquisition apparatus shown in FIGS. 1 and 2.
Figure 5:
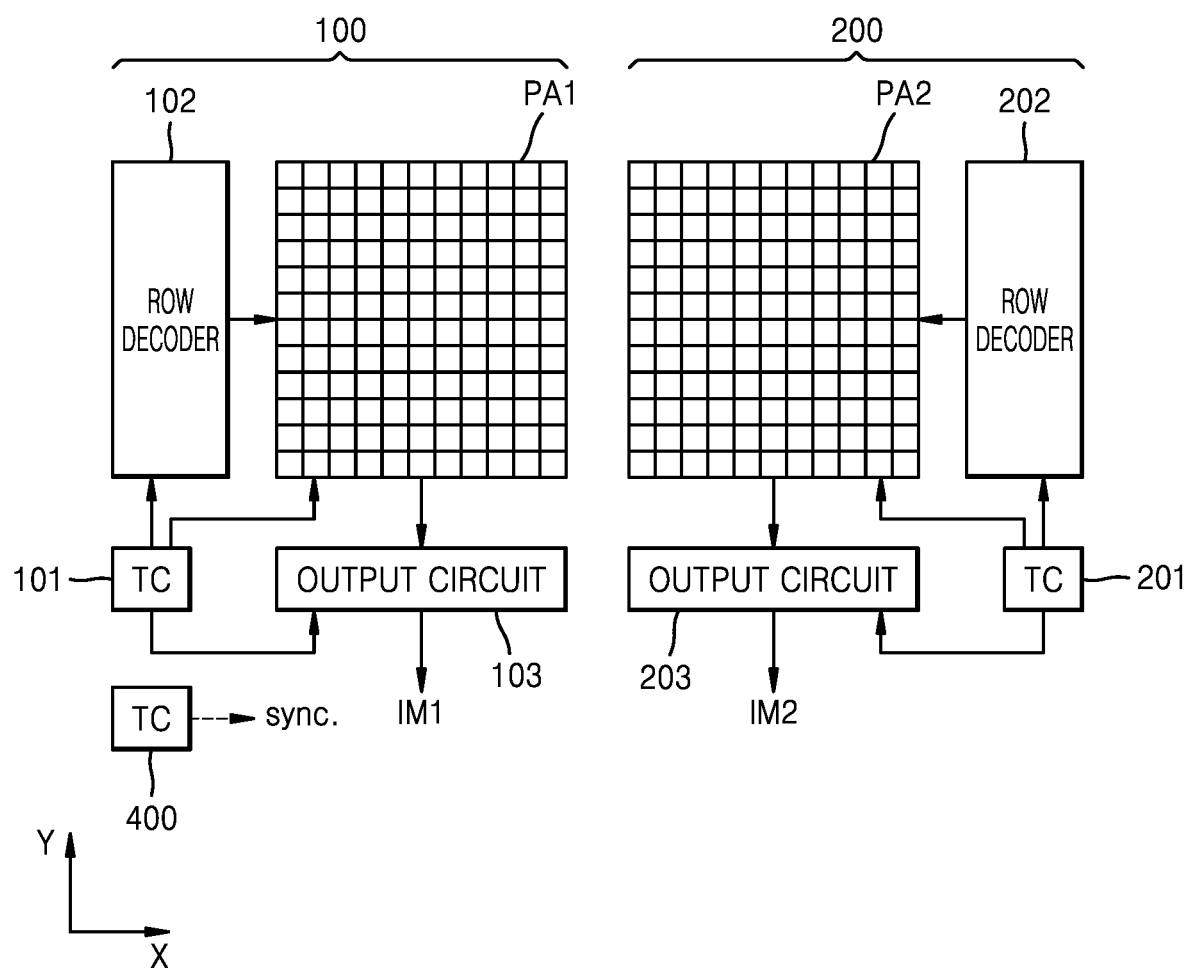
FIG. 5 is a drawing showing the circuit configuration of a multispectral imaging sensor and an imaging sensor provided in the image acquisition apparatus shown in FIGS. 1 and 2.

FIG. 4 is a conceptual diagram showing a schematic structure of the image acquisition apparatus shown in FIGS. 1 and 2, and FIG. 5 is a drawing showing the circuit configuration of a MSI sensor and an imaging sensor provided in the image acquisition apparatus shown in FIGS. 1 and 2.

The image acquisition apparatus 1000 includes a MSI sensor 100 that acquires a first image IM1 based on a first wavelength band of about 10 nm to about 1000 nm, an imaging sensor 200 that acquires a second image IM2 based on a second wavelength band, and a processor 500 that generates a third image by signal processing the first image IM1 and the second image IM2. The image acquisition apparatus 1000 may further include a first memory 300 storing data related to the first image IM1 and a second memory 310 storing data related to the second image IM2, and may further include an image output unit 700 that outputs an image.

The image acquisition apparatus 1000 may also include a first imaging optical system 190 that forms an optical image of an object OBJ in the MSI sensor 100 and a second imaging optical system 290 forming an optical image of the object OBJ in the imaging sensor 200. The first imaging optical system 190 and the second imaging optical system 290 are illustrated as including one lens, but this is an example and is not limited thereto. The first imaging optical system 190 and the second imaging optical system 290 may be configured to have the same focal length and the same angle of view.

The MSI sensor 100 includes a first pixel array PA1, which includes a first sensor layer 110 in which a plurality of first sensing elements are arrayed, and a spectral filter 120 arranged on the first sensor layer 110. The spectral filter 120 includes a plurality of filter groups, and each of the plurality of filter groups may include a plurality of unit filters having different transmission wavelength bands. The spectral filter 120 may be configured to subdivide and filter a wavelength band more than a color filter 220 of the image sensor 200. Here, the wavelength band is wider than the color filter 220, for example, in the ultraviolet to infrared wavelength range. A first micro-lens array 130 may be arranged on the first pixel array PA1. Examples of pixel arrangement applied to the first pixel array PA1 will be described later with reference to FIGS. 11 to 13.

Figure 7:
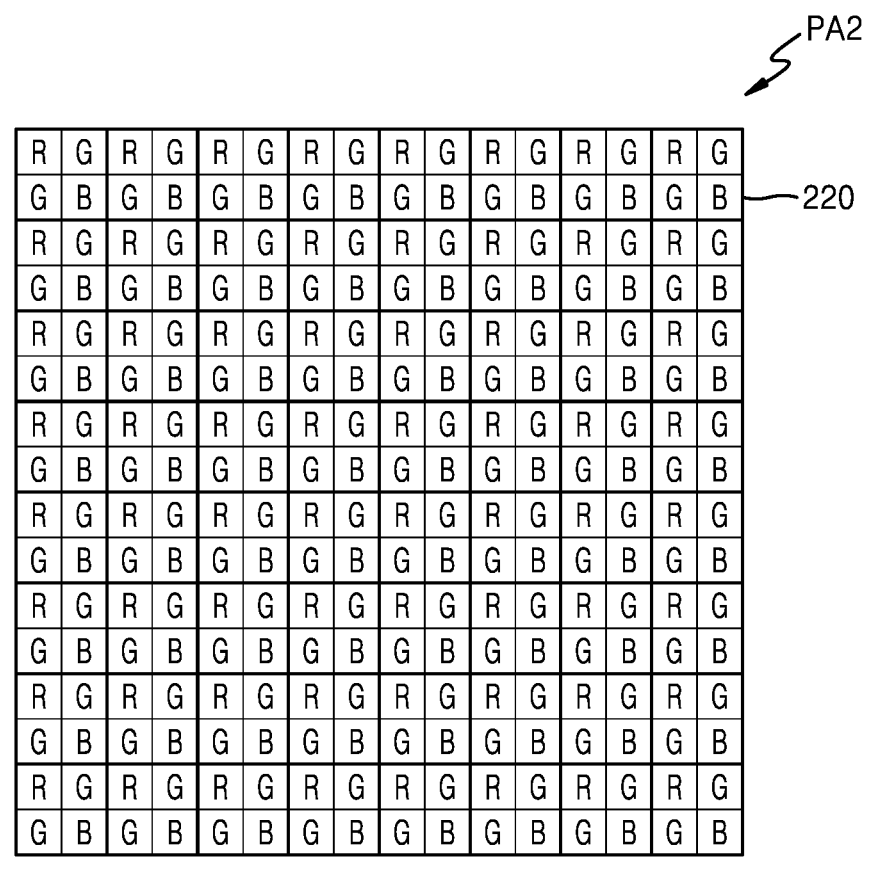

The imaging sensor 200 includes a second pixel array PA2, which includes a second sensor layer 210 in which a plurality of second sensing elements are arrayed, and a color filter 220 arranged on the second sensor layer 210. The color filter 220 may include red filters, green filters, and blue filters that are alternately arranged. A second micro-lens array 230 may be arranged on the second pixel array PA2. Examples of pixel arrangement applied to the second pixel array PA2 will be described later with reference to FIGS. 7 to 9.

The first sensor layer 110 and the second sensor layer 210 may include, but not limited to, a charge coupled device (CCD) sensor or a complementary metal oxide semiconductor (CMOS) sensor.

The first pixel array PA1 and the second pixel array PA2 may be arranged horizontally on the same substrate SU) for example, spaced apart from each other in the X direction.

The substrate SU may include first circuit elements that process signals from the first sensor layer 110 and second circuit elements that process signals from the second sensor layer 210. However, it is not limited thereto, and the first circuit elements and the second circuit elements may be provided on separate substrates.

The memory 300 in which data for the first image IM1 and the second image IM2 are stored is shown separately from the substrate SU, but this is an example. The memory 300 may be arranged on the same layer with or on the separate layer from circuit elements within the substrate. The memory 300 may be a line memory that stores images in line units or may be a frame buffer that stores an entire image. A static random access memory (SRAM) or a dynamic random access memory (DRAM) may be used for the memory 300.

Various circuit elements necessary for the image acquisition apparatus 1000 may be integrated and arranged on the substrate SU. For example, a logic layer including various analog circuits and digital circuits may be provided, and a memory layer storing data may also be provided. The logic layer may be configured on the same layer with or on the separate layer from the memory layer.

Referring to FIG. 5, a row decoder 102, an output circuit 103, and a timing controller (TC) 101 are connected to the first pixel array PA1. The row decoder 102 selects one row of the first pixel array PA1 in response to a row address signal output from the timing controller 101. The output circuit 103 outputs a photo-sensing signal in column units from a plurality of pixels arranged along the selected row. To this end, the output circuit 103 may include a column decoder and an analog-to-digital converter (ADC). For example, the output circuit 103 may include a plurality of ADCs respectively arranged for each column between the column decoder and the first pixel array PA1, or one ADC arranged at an output terminal of the column decoder. The timing controller 101, the row decoder 102, and the output circuit 103 may be implemented as one chip or separate chips. A processor for processing the first image IM1 output through the output circuit 103 may be implemented as a single chip together with the timing controller 101, the row decoder 102, and the output circuit 103.

A row decoder 202, an output circuit 203, and a timing controller (TC) 201 may be connected to the second pixel array PA2 to process signals therefrom, which is similar to the above. In addition, a processor for processing the second image IM2 output through the output circuit 203 may be implemented as a single chip together with the timing controller 201, the row decoder 202, and the output circuit 203.

It is described that the first pixel array PA1 and the second pixel array PA2 have the same size and the same number of pixels, but this is an example for convenience and is not limited thereto.

In operating two different types of sensors, timing control may be required according to different resolutions and output speeds, and the size of an area required for image matching. For example, when reading one image column based on the imaging sensor 200, the image column of the MSI sensor 100 corresponding to that area may be already stored in a buffer or may need to be newly read. Alternatively, operations of the imaging sensor 200 and the MSI sensor 100 may be synchronized using the same synchronization signal. For example, the timing controller 400 may be further provided to transmit a sync signal to the imaging sensor 200 and the MSI sensor 100.

Referring to FIGS. 4 and 5, the image acquisition apparatus 1000 includes the MSI sensor 100 and the imaging sensor 200. However, it is possible to implement the similar configuration and function even when the image acquisition apparatus 1000 includes one of the MSI sensor 100 and the imaging sensor 200.

This may also be applied to the image acquisition apparatus 1000 including the MSI sensor 100 and the processor 500 according to an example embodiment, without the configuration and function of the imaging sensor 200 illustrated in FIGS. 4 and 5.

Figure 6:
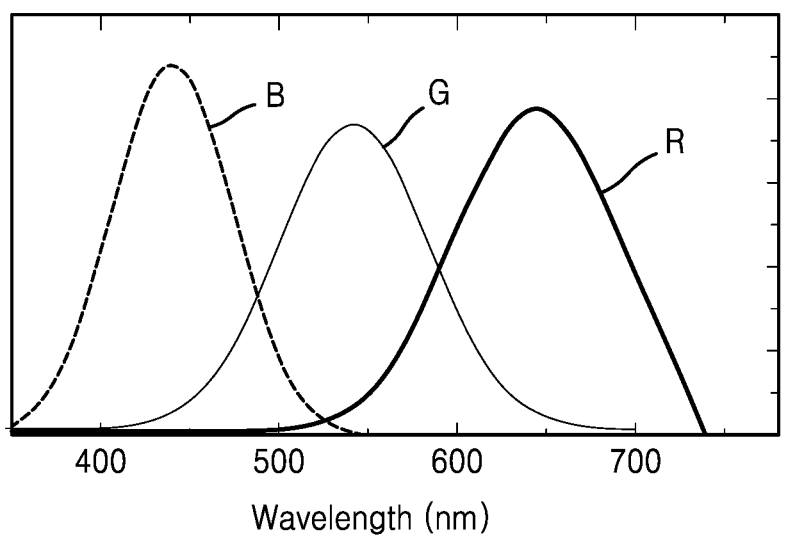
FIG. 6 is a diagram illustrating a wavelength spectrum by an imaging sensor.

FIG. 6 shows a wavelength spectrum by an imaging sensor included in an image acquisition apparatus according to an example embodiment, and FIGS. 7 to 10 show exemplary pixel arrangements of an imaging sensor included in an image acquisition apparatus according to an example embodiment.

Referring to FIG. 6, filters for filtering red (R), green (G), and blue (B) wavelength bands are arranged in a Bayer pattern in the color filter 220 provided in the second pixel array PA2. That is, one unit pixel includes sub-pixels arranged in a 2×2 array, and a plurality of unit pixels are repeatedly arranged in two dimensions. A red filter and a green filter are arranged on one row of unit pixels, and a green filter and a blue filter are arranged on a second row of unit pixels. Pixels may be arranged in other than a Bayer pattern.

Figure 9:
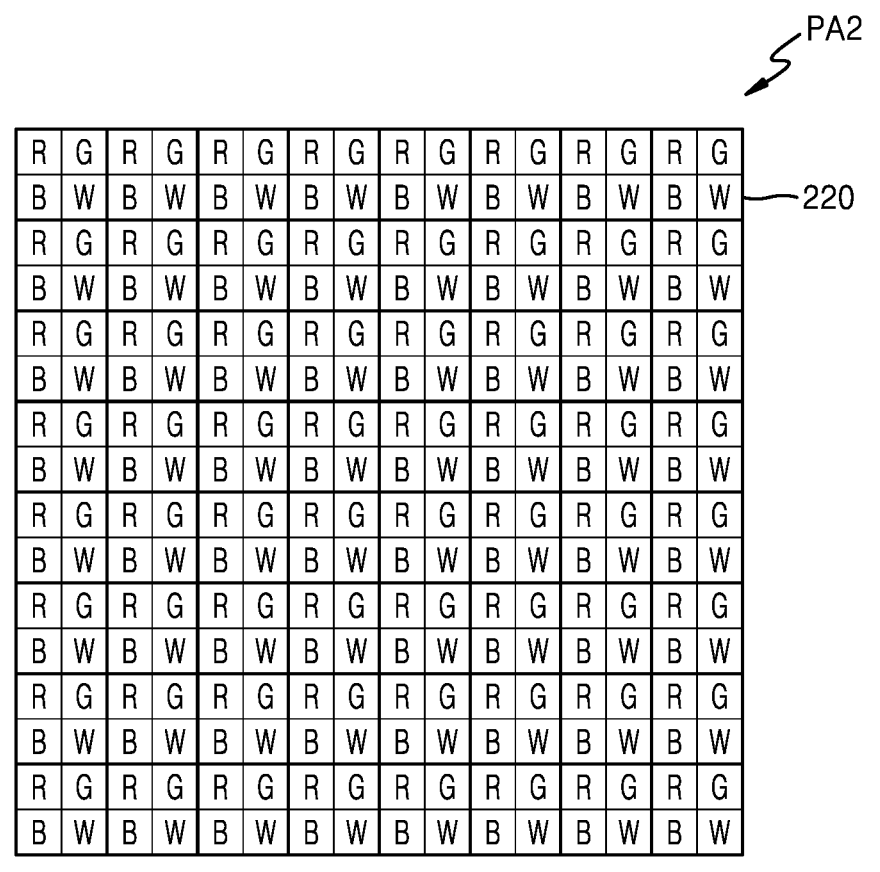

For example, referring to FIG. 8, pixels may be arranged in a CYGM array where a magenta pixel (M), a cyan pixel (C), a yellow pixel (Y), and a green pixel (G) constitute one unit pixel. Referring to FIG. 9, pixels may also be arranged in a RGBW array where a green pixel (G), a red pixel (R), a blue pixel (B) and a white pixel (W) constitute one unit pixel. Although not shown, unit pixels may be in a 3×2 array.

In addition, pixels of the second pixel array PA2 may be arranged in various ways according to color characteristics of the imaging sensor 200.

Figure 10:
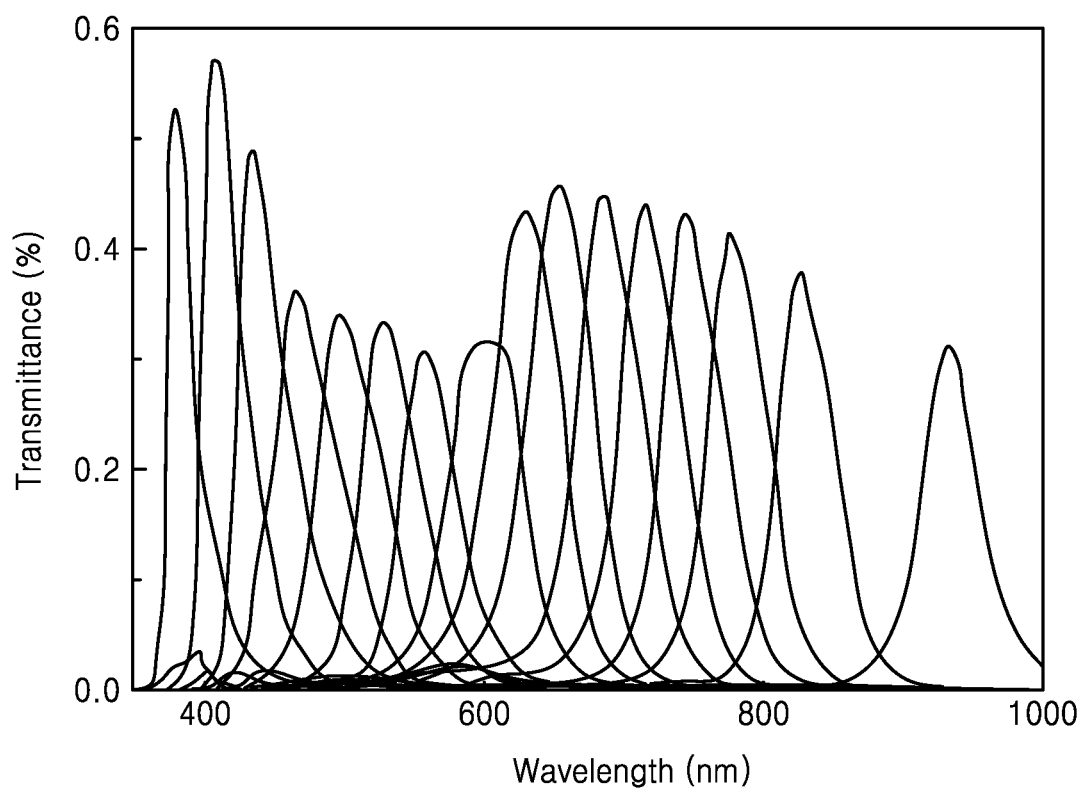
FIG. 10 is a diagram illustrating a wavelength spectrum by multispectral imaging sensor.
Figure 11:
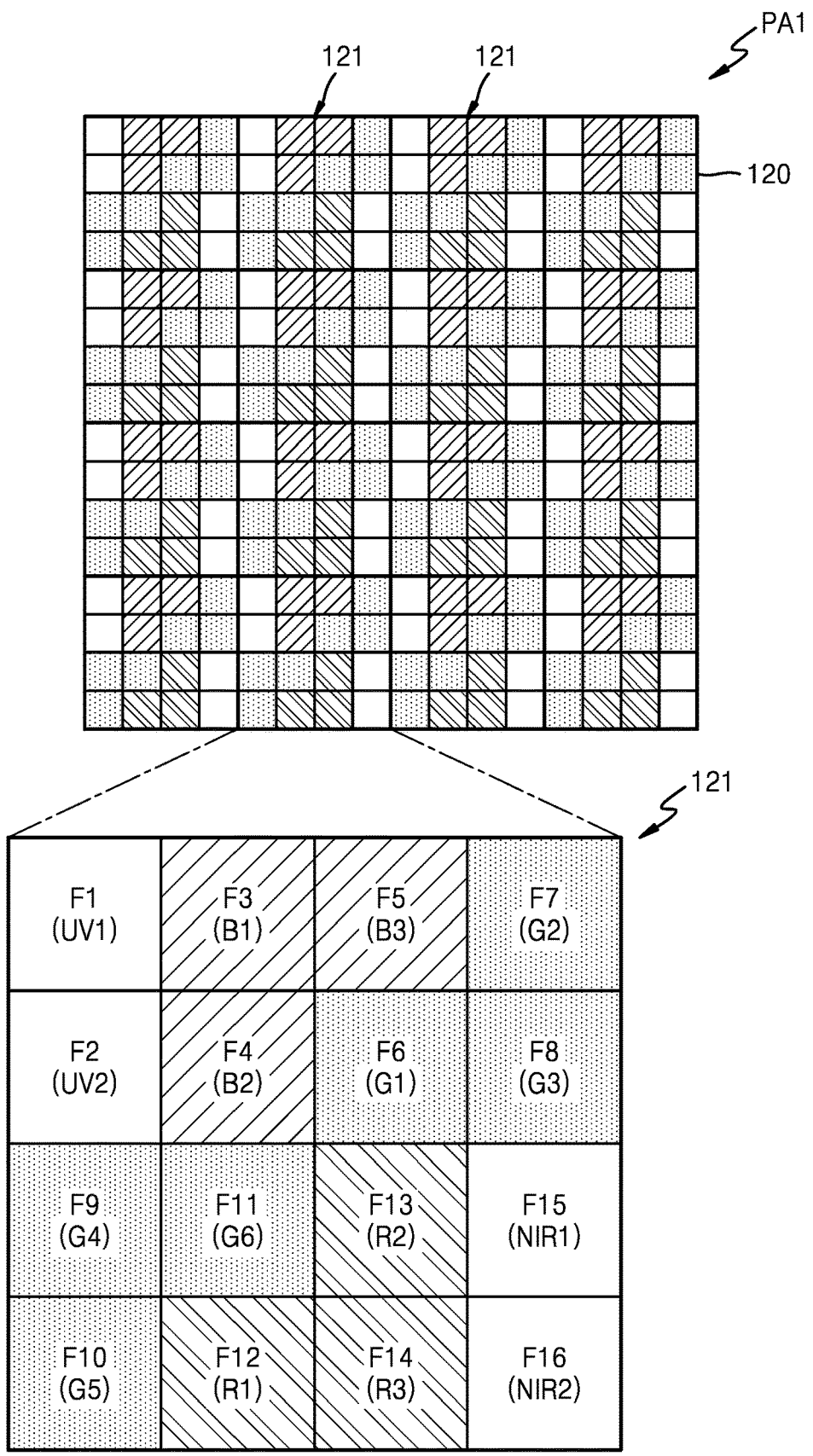
FIGS. 11 to 13 are diagrams illustrating exemplary pixel arrangements of a multispectral imaging sensor.
Figure 12:
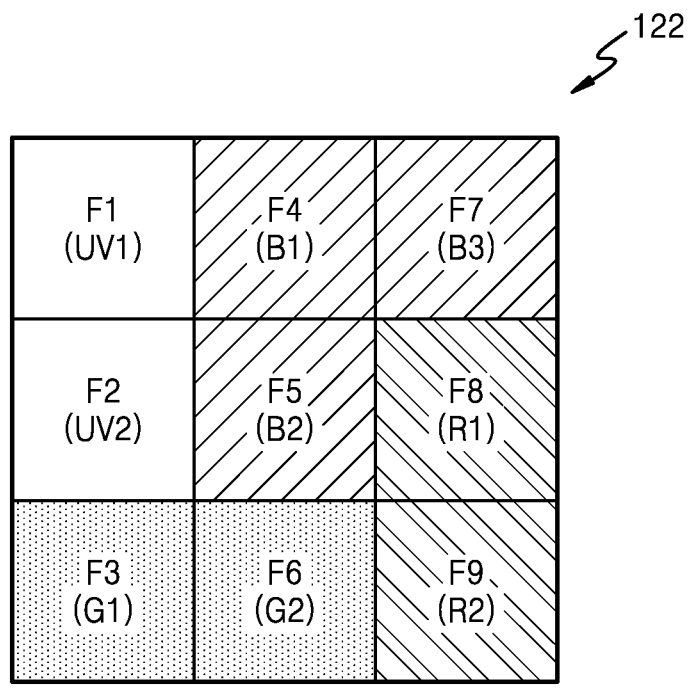
Figure 13:
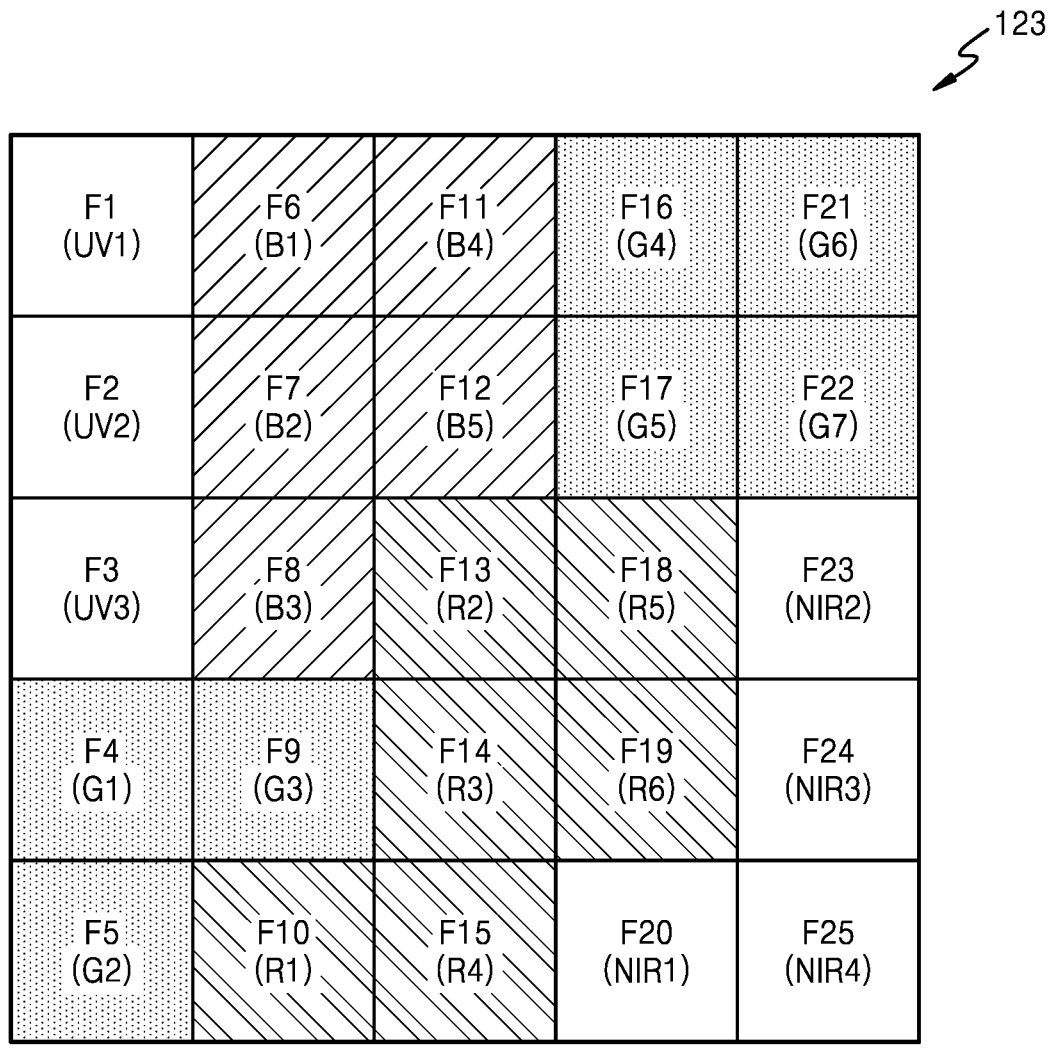

FIG. 10 shows a wavelength spectrum by a MSI sensor included in an image acquisition apparatus according to an example embodiment, and FIGS. 11 to 13 show exemplary pixel arrangements of a MSI sensor of an image acquisition apparatus according to an example embodiment.

Referring to FIG. 11, the spectral filter 120 provided in the first pixel array PA1 may include a plurality of filter groups 121 arranged in two-dimensions, wherein each filter group 121 may include 16 unit filters F1 to F16 arranged in a 4×4 array.

The first and second unit filters F1 and F2 may have central wavelengths UV1, UV2 of ultraviolet light, and the third to fifth unit filters F3 to F5 may have central wavelengths B1 to B3 of blue light. The sixteenth to eleventh filters F6 to F11 may have central wavelengths G1 to G6 of green light, and the twelfth to fourteenth unit filters F12 to F14 may have central wavelengths R1 to R3 of red light. Also, the fifteenth and sixteenth unit filters F15, F16 may have center wavelengths NIR1, NIR2 of near infrared.

FIG. 12 is a plan view of another filter group 122 provided in the spectral filter 120. Referring to FIG. 12, the filter group 122 may include 9 unit filters F1 to F9 arranged in a 3×3 array. For reference, the first and second unit filters F1, F2 may have central wavelengths UV1, UV2 of ultraviolet light, and the fourth, fifth, and seventh unit filters F4, F5, F7 may have central wavelengths B1 to B3 of blue light. The third and sixth filters F3, F6 may have central wavelengths G1, G2 of green light, and the eighth and ninth unit filters F8, F9 may have central wavelengths R1, R2 of red light.

FIG. 13 is a plan view of another filter group 123 provided in the spectral filter 120. Referring to FIG. 13, the filter group 123 may include 25 unit filters F1 to F25 arranged in a 5×5 array. For reference, the first to third unit filters F1 to F3 may have central wavelengths UV1 to UV3 of ultraviolet light, and the sixth, seventh, eighth, eleventh and twelfth unit filters F6, F7, F8, F11, F12 may have central wavelengths B1 to B5 of blue light. The fourth, fifth, and ninth unit filters F4, F5, F9 may have central wavelengths G1 to G3 of green light, and the tenth, thirteenth, fourteenth, fifteenth, eighteenth and nineteenth unit filters F10, F13, F14, F15, F18, F19 may have central wavelengths R1 to R6 of red light. Also, the twentieth, twenty-third, twenty-fourth, and twenty-fifth unit filters F20, F23, F24, F25 may have center wavelengths NIR1 to NIR4 of near infrared.

The above mentioned unit filters provided in the spectral filter 120 may have a resonance structure having two reflectors, and a transmission wavelength band may be determined according to characteristics of the resonance structure. The transmission wavelength band may be adjusted according to the material of the reflector, the material of the dielectric material in the cavity, and the thickness of the cavity. A structure using a grating, a structure using a distributed bragg reflector (DBR), and the like may also be applied to the unit filter.

Figure 19:
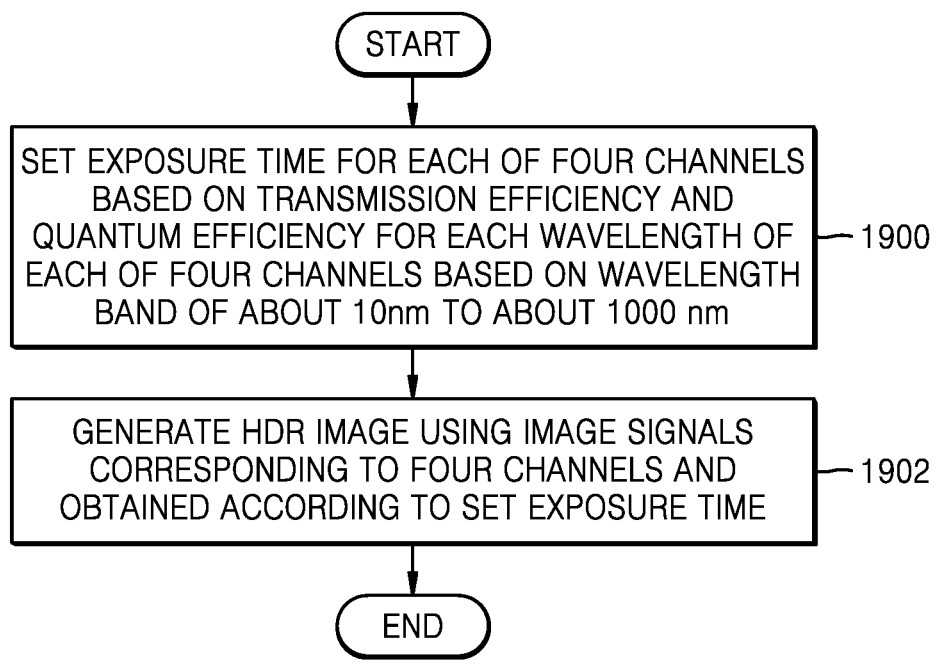
FIG. 19 is a flowchart showing a method of controlling an image acquisition apparatus according to another example embodiment.

FIG. 19 is a flowchart showing a method of controlling an image acquisition apparatus according to another example embodiment.

Referring to FIG. 19, in operation 1900, an image acquisition apparatus sets an exposure time for each of four channels based on transmission efficiency and quantum efficiency for each wavelength of each of at least four channels based on a wavelength range of about 10 nm to about 1000 nm. Images here are illustrated as having four channels, but not limited thereto, and may have four channels, 16 channels, 31 channels and the like. In an example embodiment, a different exposure time for each channel may be set based on a value obtained by multiplying transmission efficiency and quantum efficiency for each wavelength of each channel, wherein the value obtained by multiplying the transmission efficiency and the quantum efficiency for each wavelength may be a magnitude of a signal of the MSI sensor, the signal being output per unit time. In addition, a maximum value of the exposure time may be set based on a value obtained by multiplying transmission efficiency and quantum efficiency for each wavelength. In an example embodiment, if a value obtained by multiplying transmission efficiency and quantum efficiency for each wavelength is equal to or greater than a first threshold value, a first exposure time may be set for the channel; and if a value obtained by multiplying transmission efficiency and quantum efficiency for each wavelength is less than a first threshold value, a second exposure time longer than a first exposure time may be set for the channel. The first threshold value is an arbitrary value. In addition, the exposure time may be set differently based on one threshold value, but it is also possible to set the exposure time differently based on a plurality of threshold values.

Each channel may include N×N pixels, and an exposure time may be set for each pixel, wherein N may be a natural number of 2 or greater, and wherein the exposure time may be set differently for each pixel. If the brightness of an object is greater than or equal to a first threshold value, an image signal acquired from a pixel for which the shortest exposure time may be set among N×N pixels may be extracted; or if the brightness of an object is less than the first threshold value, an image signal obtained from a pixel having the longest exposure time among N×N pixels may be extracted. The brightness of the subject may be pre-measured using a brightness histogram acquired by an image acquisition apparatus or an illuminance sensor. The first threshold value which is an arbitrary value may be predetermined according to the structure and application of the MSI sensor.

In operation 1902, an HDR image is generated using image signals corresponding to the four channels obtained according to the exposure time set in operation 1900. For reference, various algorithms may be used to generate an HDR image using image signals for each channel. For example, a Debevec algorithm, a Robertson algorithm, or a Mertens algorithm may be used. The image signal for each channel may be a signal obtained from a pixel or pixels constituting each channel, or a signal extracted from any one pixel among a plurality of pixels constituting a channel.

In a method of controlling the image acquisition apparatus according to an example embodiment, an HDR image may be obtained using image signals acquired by applying a different exposure time to each channel or each pixel constituting each channel in a MSI sensor. A stable HDR image may be obtained even when a dynamic object as well as a static object is photographed.

The imaging sensor 1000 including the above-mentioned spectral filter may be employed in various high-performance optical apparatuses or high-performance electronic apparatuses. Such electronic apparatuses include, for example, smart phones, mobile phones, cell phones, personal digital assistants (PDAs), laptops, PCs, various portable devices, home appliances, security cameras, medical cameras, vehicles, and the Internet of Things (IoT) devices or other mobile or non-mobile computing devices, but are not limited thereto.

In addition to the imaging sensor 1000, the electronic apparatuses may further include a processor that controls an imaging sensor, for example, an application processor (AP) and may control a plurality of hardware or software components by driving an operating system or an application program through a processor and perform various data processing and calculations. The processor may further include a graphic processing unit (GPU) and/or an image signal processor. If the processor includes an image signal processor, the image (or video) obtained by the imaging sensor may be stored and/or output using the processor.

Figure 20:
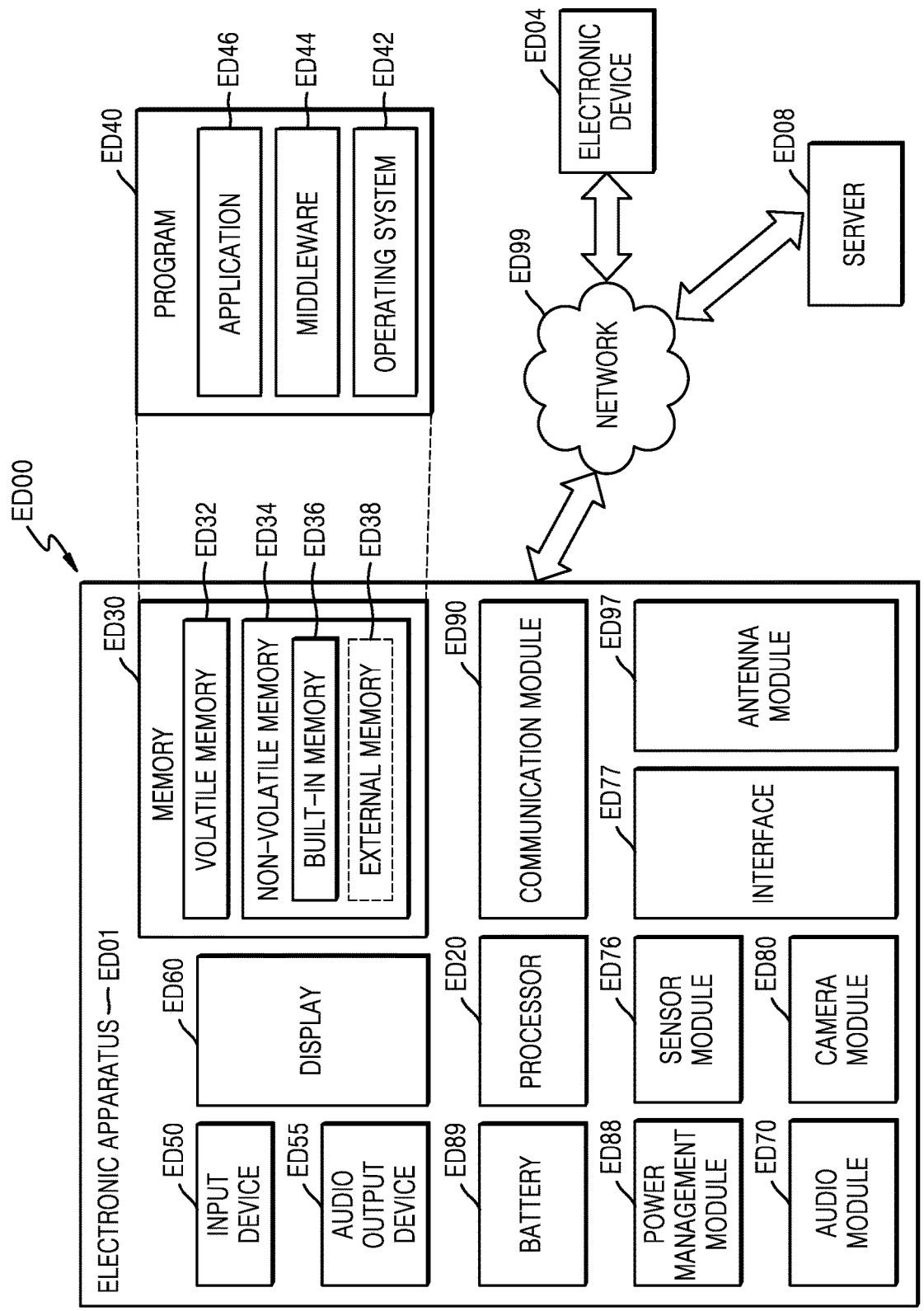
FIG. 20 is a block diagram showing a schematic structure of an electronic apparatus according to another example embodiment.

FIG. 20 is a block diagram illustrating an example of an electronic apparatus 01 including an imaging sensor 1000. Referring to FIG. 20, an electronic apparatus 01 may communicate with another electronic apparatus 02 or a server 08 in a network environment O0. The electronic apparatus 01 may include a processor 20, memory 30, an input device 50, an audio output device 55, a display 60, an audio module 70, a sensor module 76, and an interface 77, a haptic module 79, a camera module 80, a power management module 88, a battery 89, a communication module 90, a subscriber identification module 96, and/or an antenna module 97. In the electronic apparatus 01, some of these components (such as the display 60 may be omitted or other components may be added. Some of these components may be implemented as a single integrated circuit. For example, the sensor module 76 (e.g., fingerprint sensor, iris sensor, illuminance sensor, etc.) may be embedded in the display 60 (e.g., display, etc.). In addition, if the imaging sensor 1000 includes a spectral function, some functions (e.g., color sensing, illuminance sensing) of the sensor module may be implemented in the imaging sensor 1000, not in a separate sensor module.

The processor 20 may execute software (a program 40, etc.) to control one or a plurality of other components (e.g., hardware, software components etc.) of the electronic apparatus 01 connected to the processor 20, and may perform various data processing or calculations. As part of data processing or calculation, the processor 20 may load commands and/or data received from other components (the sensor module 76, the communication module 90 etc.) into volatile memory 32, process the command and/or data stored in the volatile memory 32, and store the resulting data in non-volatile memory 34.

The memory 30 may store various data required by components (e.g., the processor 20, the sensor module 76, etc.) of the electronic apparatus 01. The data may include, for example, input data and/or output data for software (e.g., the program 40) and commands related thereto. The memory 30 may include a volatile memory 32 and/or a non-volatile memory 34. The non-volatile memory 32 may include a built-in memory 36 fixedly mounted in the electronic apparatus 01 and a removable external memory 38.

The program 40 may be stored as software in the memory 30 and may include an operating system 42, middleware 44, and/or an application 46. The camera module 80 may capture still images and moving images. The camera module 80 may include a lens assembly including one or a plurality of lenses, an imaging sensor 1000 of FIG. 1, image signal processors, and/or flashes. A lens assembly included in the camera module 80 may collect light emitted from a target object for image capturing.

Figure 21:
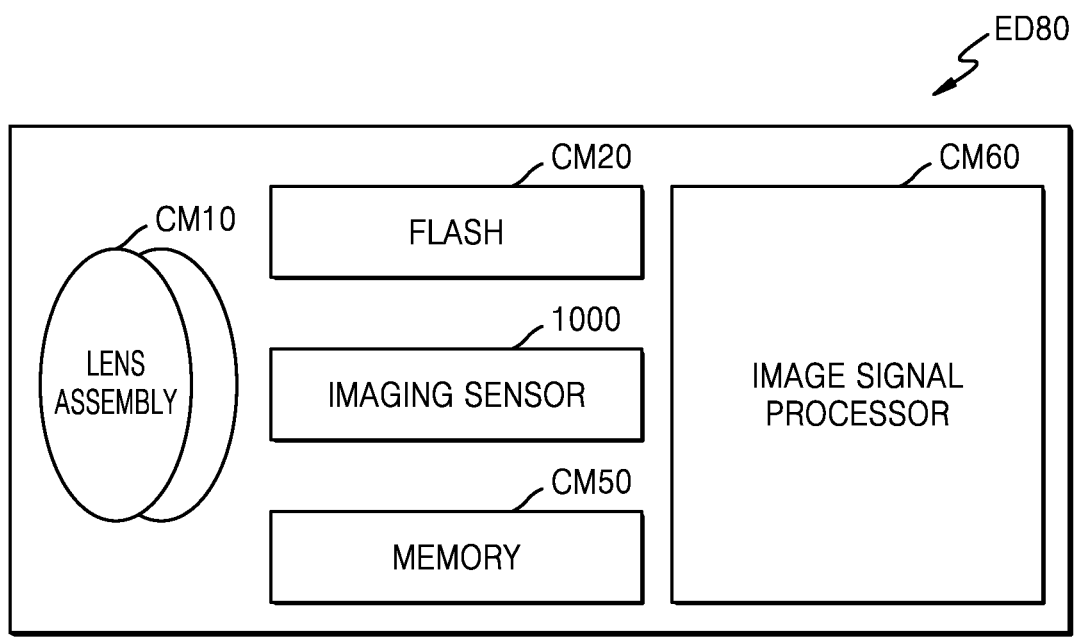
FIG. 21 is a block diagram schematically showing a camera module provided in the electronic apparatus of FIG. 20.

FIG. 21 is a block diagram illustrating the camera module 80 of FIG. 20. Referring to FIG. 20, the camera module 80 may include a lens assembly CM10, a flash CM20, an imaging sensor 1000, an image stabilizer CM40, memory CM50 (buffer memory, etc.), and/or an image signal processor CM60. The lens assembly CM10 may collect light emitted from a target object for image capturing. The camera module 80 may include a plurality of lens assemblies CM10, and may be a dual or multi-camera, a 360-degree camera, or a spherical camera. Some of the plurality of lens assemblies CM10 may have the same lens properties (e.g., angle of view, focal length, auto focus, F number, optical zoom, etc.) or different lens properties. The lens assembly CM10 may include a wide-angle lens or a telephoto lens. Filter arrays in a dual or multi-camera module may have different combinations of properties.

The flash CM20 may emit light used to enhance light emitted or reflected from an object. The flash CM20 may include one or a plurality of light emitting diodes (e.g., red-green-blue (RGB) L, white L, infrared L, ultraviolet L, etc.), and/or a Xenon Lamp. The imaging sensor 1000 may be the imaging sensor described in FIG. 1, and may obtain an image corresponding to an object by converting light emitted or reflected from the object and transmitted through the lens assembly CM10 into an electrical signal. The imaging sensor 1000 may include one or a plurality of sensors selected from among imaging sensors having different properties, such as an RGB sensor, a black and white (BW) sensor, an IR sensor, or a UV sensor. Each of the sensors included in the imaging sensor 1000 may be implemented as a charged coupled device (CCD) sensor and/or a complementary metal oxide semiconductor (CMOS) sensor.

The image stabilizer CM40 may move one or a plurality of lenses or the imaging sensor 1000 included in the lens assembly CM10 in a specific direction in response to the movement of the camera module 80 or the electronic apparatus CM01 including the same, or may control the operation characteristics of the imaging sensor 1000 (e.g., adjustment of read-out timing, etc.) so that negative effects caused by motion may be compensated for. The image stabilizer CM40 may detect the movement of the camera module 80 or the electronic apparatus 01 by using a gyro sensor (not shown) or an acceleration sensor (not shown) arranged inside or outside the camera module 80. The image stabilizer CM40 may be implemented optically.

The memory CM50 may store some or all data of an image acquired through the imaging sensor 1000 for a next image processing task. For example, when a plurality of images are acquired at high speed, the memory CM50 may be used to store acquired original data (e.g., Bayer-Patterned data, high resolution data etc.), display only low resolution images for selection and deliver the original data of the selected image to the image signal processor CM60. The memory CM50 may be integrated into the memory 30 of the electronic apparatus 01, or may be configured as a separate memory operating independently.

The image signal processor CM60 may perform image processing on images acquired through the imaging sensor 1000 or image data stored in the memory CM50. Image processing may include depth map generation, 3D modeling, panorama generation, feature point extraction, image synthesis, and/or image compensation (e.g., noise reduction, resolution adjustment, brightness adjustment, blurring, sharpening, softening, etc.). The image signal processor CM60 may perform control (e.g., exposure time control, read-out timing control, etc.) for components (such as the imaging sensor 1000) included in the camera module 80. The images processed by the image signal processor CM60 may be stored back in the memory CM50 for further processing or provided to external components of the camera module 80 (e.g., the memory 30, the display 60, the electronic apparatus 02, an electronic apparatus 04, the server 08, etc.). The image signal processor CM60 may be integrated into the processor 20 or configured as a separate processor that operates independently of the processor 20. If the image signal processor CM60 is configured separate from the processor 20, the image processed by the image signal processor CM60 may be displayed on the display 60 after undergoing additional image processing by the processor 20.

The electronic apparatus 01 may include a plurality of camera modules 80 each having different properties or functions. One of the plurality of camera modules 80 may be a wide-angle camera and the other may be a telephoto camera. Similarly, one of the plurality of camera modules 80 may be a front camera and the other may be a rear camera. In addition, the camera module 80 may be a composite camera module in which an imaging sensor having a conventional RGB three-color filter and a spectral imaging sensor composed of a spectral filter are combined and data of the combined two imaging sensors is integrated and processed.

Figure 22:
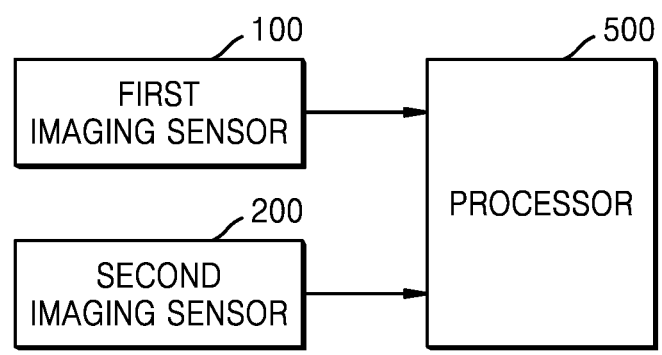
FIG. 22 is a block diagram showing a schematic structure of a complex camera module having a plurality of imaging sensors of different properties.

FIG. 22 is a block diagram showing a schematic structure of a composite camera module having a plurality of imaging sensors each having different properties. A first imaging sensor 100 may be a conventional RGB imaging sensor, and a second imaging sensor 200 may be a multispectral image (MSI) sensor, The RGB imaging sensor may be a CMOS imaging sensor. The RGB sensor may generate images of three channels by sensing spectrums representing R, G, and B using a Bayer color filter array. Other types of color filter arrays may also be used. The MSI sensor senses and displays light of a different wavelength than the RGB imaging sensor. The MSI sensor is characterized by sensing light of more types of wavelengths by having a larger number of channels.

The processor 500 may process image information obtained from each of the imaging sensors 100 and 200 and combine data in a desired method to improve image quality or performance of identifying an object in an image.

Figure 23A:
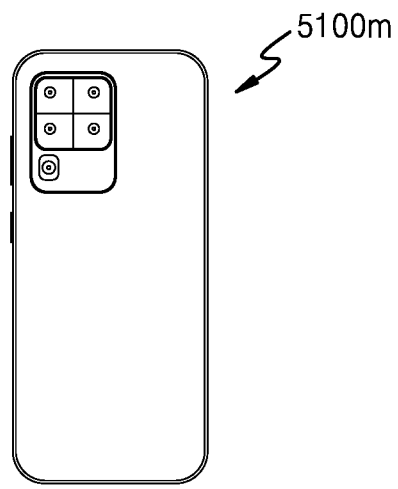
FIGS. 23A to 23E and 24A to 24E show various examples of an electronic apparatus to which an image acquisition apparatus according to embodiments is applied.
Figure 23B:
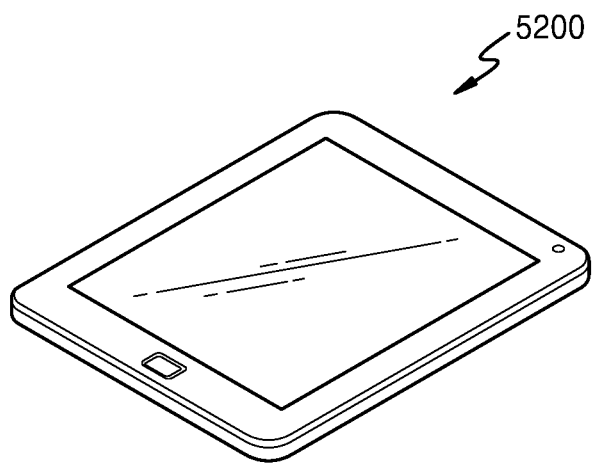
Figure 23C:
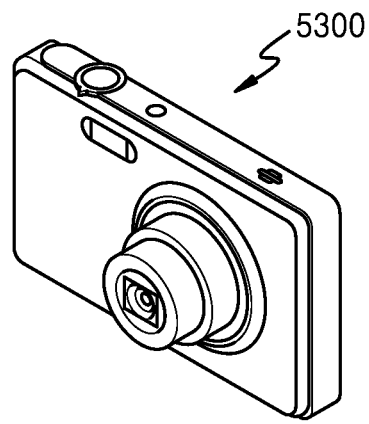
Figure 23D:
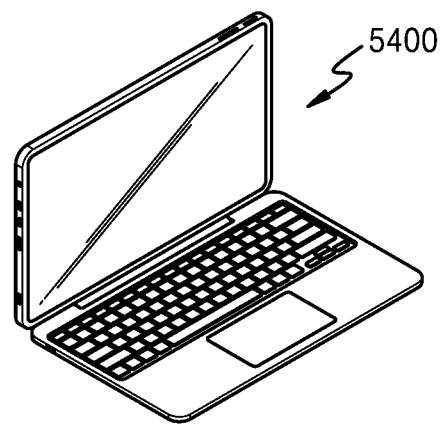
Figure 23E:
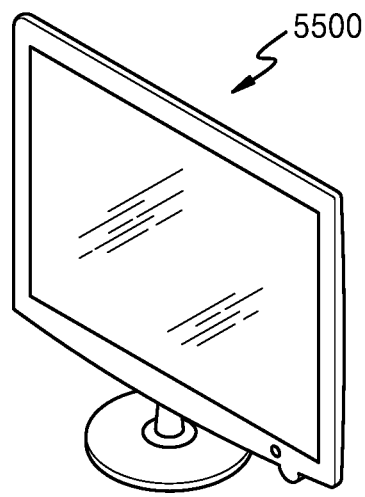

The imaging sensor 1000 according to the embodiments may be applied to a mobile phone or smart phone 5100m shown in FIG. 23A, a tablet or smart tablet 5200 shown in FIG. 23B, a digital camera or camcorder 5300 shown in FIG. 23C, a laptop 5400 shown in FIG. 23D, or a television or smart television 5500 shown in FIG. 23E. For example, the smart phone 5100m or the smart tablet 5200 may include a plurality of high resolution cameras each having a high resolution imaging sensor. Using high-resolution cameras, depth information of objects in an image may be extracted, out-focusing of the image may be adjusted, or objects in the image may be automatically identified.

Figure 24A:
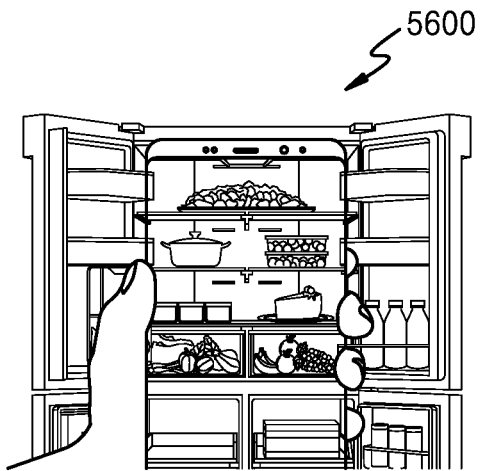
Figure 24B:
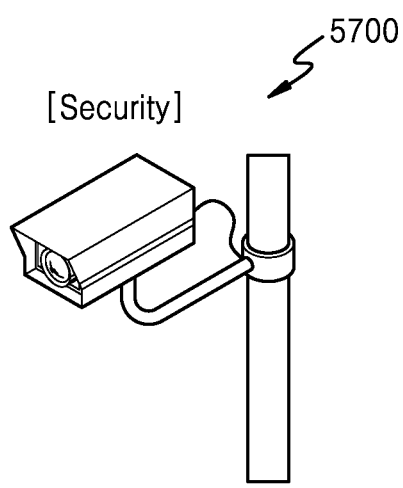
Figure 24C:
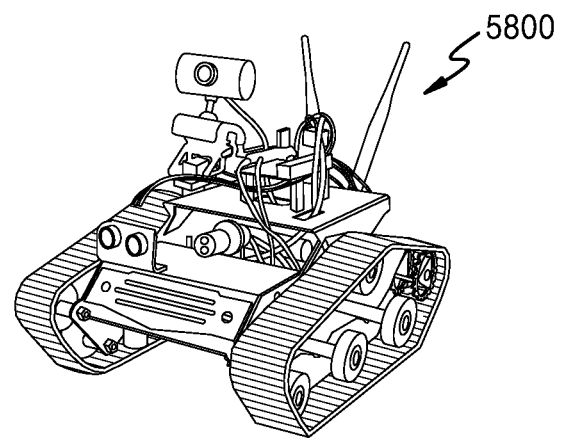
Figure 24D:
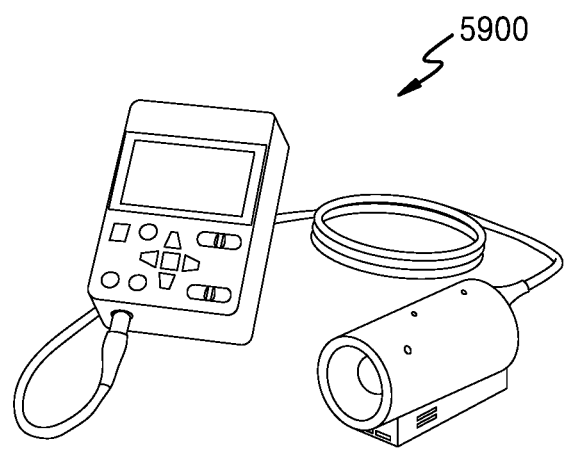

In addition, the imaging sensor 1000 may be applied to a smart refrigerator 5600 shown in FIG. 24A, a security camera 5700 shown in FIG. 24B, a robot 5800 shown in FIG. 24C, and a medical camera 5900 shown in 24D or the like. For example, the smart refrigerator 5600 may automatically recognize food in a refrigerator using an imaging sensor, and notify a user of the presence or absence of specific food, and the type of food that has been in and out thereof using a smart phone. The security camera 5700 may provide ultra-high resolution images and recognize objects or people in the images even in a dark environment by using high sensitivity. The robot 5800 may provide high-resolution images when deployed at a disaster or industrial site to which a person cannot directly approach. The medical camera 5900 may provide high resolution images for diagnosis or surgery and dynamically adjust a field of view.

Figure 24E:
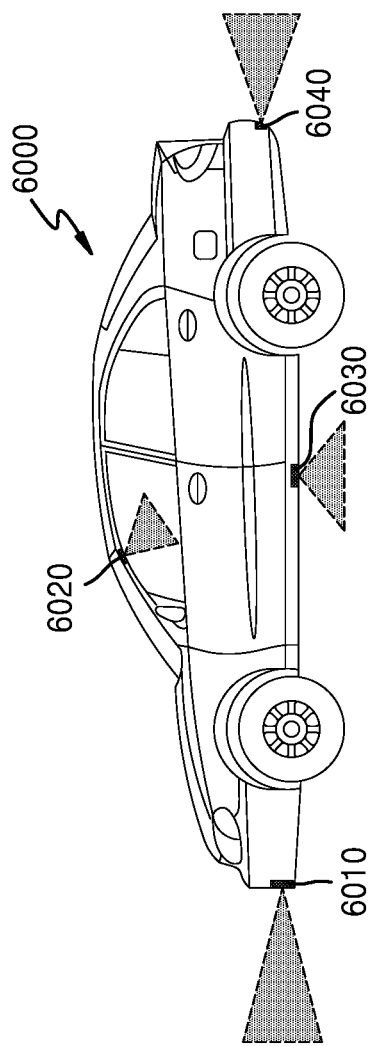

In addition, the imaging sensor 1000 may be applied to a vehicle 6000 as shown in FIG. 24E. The vehicle 6000 may include a plurality of vehicle cameras 6010, 6020, 6030, and 6040 arranged in various locations, and each of the vehicle cameras 6010, 6020, 6030, and 6040 may include an imaging sensor according to an example embodiment. The vehicle 6000 may provide a driver with various information about the interior or surroundings of the vehicle 6000 using a plurality of vehicle cameras 6010, 6020, 6030, and 6040 and provide information necessary for autonomous driving by automatically recognizing objects or people in the image.

The image acquisition apparatus according to an example embodiment may acquire an HDR image using image signals obtained by applying a different exposure time for each channel in a MSI sensor.

A stable HDR image may be obtained even when a dynamic object as well as a static object is photographed.

The above mentioned image acquisition apparatus may be employed in various electronic apparatuses.

Although the imaging sensor including the above mentioned spectral filter and the electronic apparatus including the same have been described with reference to the embodiments shown in drawings, this is only an example, and a person skilled in the art may understand that various modifications and other equivalent embodiments are possible. Therefore, the disclosed embodiments should be considered from an illustrative rather than a limiting point of view. The scope of rights is shown in the claims rather than the foregoing description, and all differences within an equivalent scope should be construed as being included in the scope of rights.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An image acquisition apparatus comprising:
   a multispectral imaging (MSI) sensor configured to acquire a plurality of image signals corresponding to at least four channels based on a wavelength band of about 10 nm to about 1000 nm; and
   a processor configured to:
   set an exposure time for each of the at least four channels based on transmission efficiency for each of a plurality of wavelengths of each of the at least four channels and quantum efficiency for each of the plurality of wavelengths of each of the at least four channels, and
   generate a high dynamic range (HDR) image based on the plurality of image signals corresponding to the at least four channels, the plurality of image signals being obtained based on the set exposure time,
   wherein the exposure time is separately set for each of the at least four channels based on transmission efficiency and the quantum efficiency.

2. The image acquisition apparatus of claim 1, wherein the processor is further configured to set a different exposure time for each of the at least four channels based on a value obtained by multiplying the transmission efficiency for each of the plurality of wavelengths and the quantum efficiency for each of the plurality of wavelengths.

3. The image acquisition apparatus of claim 1, wherein each of the at least four channels comprises N×N pixels, wherein the processor is further configured to set a different exposure time for each of the N×N pixels, and wherein N is a natural number greater than or equal to 2.

4. The image acquisition apparatus of claim 3, wherein the processor is further configured to extract a first image signal, among the plurality of image signals, from a first pixel for which a shortest exposure time is set among the N×N pixels when a brightness of an object is greater than or equal to a first threshold value.

5. The image acquisition apparatus of claim 3, wherein the processor is further configured to extract a second image signal, among the plurality of image signals, from a second pixel for which a longest exposure time is set among the N×N pixels when a brightness of an object is less than a first threshold value.

6. The image acquisition apparatus of claim 1, wherein a maximum value of the exposure time is set based on a value obtained by multiplying the transmission efficiency for each of the plurality of wavelengths and the quantum efficiency for each of the plurality of wavelengths.

7. The image acquisition apparatus of claim 1, wherein a value obtained by multiplying the transmission efficiency for each of the plurality of wavelengths and the quantum efficiency for each of the plurality of wavelengths is a magnitude of a signal of the MSI sensor, the signal being output per unit time.

8. The image acquisition apparatus of claim 7, wherein the processor is further configured to:
   set a first exposure time for a first channel in which the value obtained by multiplying the transmission efficiency for each of the plurality of wavelengths and the quantum efficiency for each of the plurality of wavelengths of the first channel is equal to or greater than a first threshold value, and
   set a second exposure time for a second channel, in which the value obtained by multiplying the transmission efficiency for each of the plurality of wavelengths and the quantum efficiency for each of the plurality of wavelengths of the second channel is less than the first threshold value, the second exposure time being longer than the first exposure time.

9. The image acquisition apparatus of claim 1, wherein the processor is further configured to:
   group channels having similar wavelength bands among the at least four channels, and
   set a different exposure time for each of the grouped channels.

10. The image acquisition apparatus of claim 1, wherein respective areas of the at least four channels of the MSI sensor are different from each other.

11. The image acquisition apparatus of claim 1, wherein the processor is further configured to set a different analog gain value for each of the at least four channels.

12. An electronic apparatus comprising an image acquisition apparatus of claim 1.

13. A method of controlling an image acquisition apparatus a multispectral imaging (MSI) sensor configured to acquire a plurality of image signals corresponding to at least four channels based on a wavelength band of about 10 nm to about 1000 nm, the method comprising:
   setting an exposure time for each of the at least four channels based on transmission efficiency for each of a plurality of wavelengths of each of the at least four channels and quantum efficiency for each of the plurality of wavelengths of each of the at least four channels; and generating a high dynamic range (HDR) image based on the plurality of image signals corresponding to the at least four channels the plurality of image signals being obtained based on the set exposure time, wherein the exposure time is separately set for each of the at least four channels based on transmission efficiency and the quantum efficiency.

14. The method of claim 13, wherein the setting of the exposure time comprises setting a different exposure time for each of the at least four channels based on a value obtained by multiplying the transmission efficiency for each of the plurality of wavelengths and the quantum efficiency for each of the plurality of wavelengths.

15. The method of claim 13,
wherein each of the at least four channels includes N×N pixels,
wherein the setting of the exposure time comprises setting an exposure time differently for each of the N×N pixels, and
wherein N is a natural number greater than or equal to 2.

16. The method of claim 15, wherein the generating of the HDR further comprises extracting a first image signal, among the plurality of image signals, from a pixel for which a shortest exposure time is set among the N×N pixels if a brightness of an object is greater than or equal to a first threshold value.

17. The method of claim 15, wherein the generating of the HDR further comprises extracting a second image signal, among the plurality of image signals, from a pixel for which a longest exposure time is set among the N×N pixels if a brightness of an object is less than a first threshold value.

18. The method of claim 13, wherein a maximum value of the exposure time is set based on a value obtained by multiplying the transmission efficiency for each of the plurality of wavelengths and the quantum efficiency for each of the plurality of wavelengths.

19. The method of claim 13, wherein a value obtained by multiplying the transmission efficiency for each of the plurality of wavelengths and the quantum efficiency for each of the plurality of wavelengths is a magnitude of a signal of the MSI sensor, the signal being output per unit time.

20. The method of claim 19, wherein the setting of the exposure time comprises:
setting a first exposure time for a first channel, in which, the value obtained by multiplying the transmission efficiency for each of the plurality of wavelengths and the quantum efficiency for each of the plurality of wavelengths of the first channel is equal to or greater than a first threshold value; and
setting a second exposure time for a second channel, in which, the value obtained by multiplying the transmission efficiency for each of the plurality of wavelengths and the quantum efficiency for each of the plurality of wavelengths of the second channel is less than the first threshold value, the second exposure time being longer than the first exposure time.

* * * * *